United States Patent
Whalen

(10) Patent No.: US 8,091,294 B2
(45) Date of Patent: Jan. 10, 2012

(54) FOLDING PET STAIRCASE

(76) Inventor: Robert F. Whalen, Belvidere, IL (US)

( * ) Notice: Subject to any disclaimer, the term of this patent is extended or adjusted under 35 U.S.C. 154(b) by 197 days.

(21) Appl. No.: 12/421,757

(22) Filed: Apr. 10, 2009

(65) Prior Publication Data

US 2009/0188444 A1    Jul. 30, 2009

Related U.S. Application Data

(63) Continuation-in-part of application No. 11/313,135, filed on Dec. 20, 2005, now abandoned.

(60) Provisional application No. 60/639,895, filed on Dec. 22, 2004.

(51) Int. Cl.
  *E04F 11/00* (2006.01)
  *E04F 19/10* (2006.01)

(52) U.S. Cl. .......................................... 52/183; 52/182

(58) Field of Classification Search .................. 52/182, 52/183; 182/157, 127, 95, 96, 97; 280/166; 414/537; 296/62; 244/129.6; 114/362
See application file for complete search history.

(56) References Cited

U.S. PATENT DOCUMENTS

| | | | |
|---|---|---|---|
| 196,679 A | 10/1877 | Lane | |
| 600,281 A | 3/1898 | Garland | |
| 2,236,465 A * | 3/1941 | Carlson | 52/179 |
| 2,567,302 A | 9/1951 | Sip | |
| 2,575,615 A | 11/1951 | Crump | |
| 3,462,170 A | 8/1969 | Smith et al. | |
| 3,493,077 A | 2/1970 | Doten | |
| 3,892,290 A | 7/1975 | Lang | |
| 4,108,457 A | 8/1978 | Garrett | |
| 4,180,143 A | 12/1979 | Clugston | |
| 4,424,751 A | 1/1984 | Blöchlinger | |
| 4,527,941 A | 7/1985 | Archer | |
| 4,571,144 A | 2/1986 | Guidry et al. | |
| 4,615,160 A | 10/1986 | LeBlond | |
| 4,623,160 A | 11/1986 | Trudell | |
| 4,733,752 A | 3/1988 | Sklar | |
| 5,005,850 A | 4/1991 | Baughman | |
| 5,039,119 A | 8/1991 | Baughman | |
| 5,456,479 A | 10/1995 | Conger | |
| D382,676 S | 8/1997 | Holbrook | |
| 5,870,788 A | 2/1999 | Witkin | |
| 5,876,051 A | 3/1999 | Sage, Sr. | |
| 5,941,342 A | 8/1999 | Lee | |
| 5,957,237 A | 9/1999 | Tigner | |

(Continued)

FOREIGN PATENT DOCUMENTS

WO    WO 2005/054595 A1    6/2005

(Continued)

*Primary Examiner* — Eileen D Lillis
*Assistant Examiner* — Mark Wendell
(74) *Attorney, Agent, or Firm* — Reinhart Boerner Van Deuren P.C.

(57) ABSTRACT

A method and apparatus are provided, for allowing pets to ascend and descend on a foldable staircase having a plurality of stair treads operatively connected by articulating links in such a manner that the treads can be pivoted in unison from a stowed position of the staircase, in which the treads are substantially stacked upon one another, to a plurality of extended positions, in which the links position the treads in a spaced and parallel relationship to one another. A latch selectively secures the staircase in a selected one of the extended positions. The latch is configured for preventing further pivoting of the treads in either direction between the stowed and extended positions of the staircase, when the latch is engaged.

23 Claims, 22 Drawing Sheets

U.S. PATENT DOCUMENTS

| | | |
|---|---|---|
| 6,119,634 A | 9/2000 | Myrick |
| 6,179,312 B1 * | 1/2001 | Paschke et al. ............... 280/166 |
| 6,438,909 B2 * | 8/2002 | Birch et al. ....................... 52/182 |
| 6,895,717 B1 * | 5/2005 | Grinstead ......................... 52/182 |
| 6,966,597 B2 | 11/2005 | Tegtmeier |
| 7,073,297 B2 * | 7/2006 | Grinstead ......................... 52/182 |
| 7,185,381 B1 | 3/2007 | Heartsill et al. |
| D555,845 S | 11/2007 | Khubani |
| 7,621,236 B2 | 11/2009 | Steffey et al. |
| 2002/0029532 A1 * | 3/2002 | Eve et al. ......................... 52/182 |
| 2004/0244724 A1 | 12/2004 | Runge |
| 2005/0056233 A1 | 3/2005 | O'Leary et al. |
| 2005/0210775 A1 * | 9/2005 | Grinstead ......................... 52/182 |
| 2007/0199258 A1 | 8/2007 | Reeves |
| 2007/0289556 A1 * | 12/2007 | Hoffman et al. ............... 119/847 |
| 2008/0257280 A1 * | 10/2008 | Jakubowski et al. ......... 119/849 |
| 2010/0083913 A1 | 4/2010 | Gibson |

FOREIGN PATENT DOCUMENTS

WO    WO 2006/069086 A2    6/2006

* cited by examiner

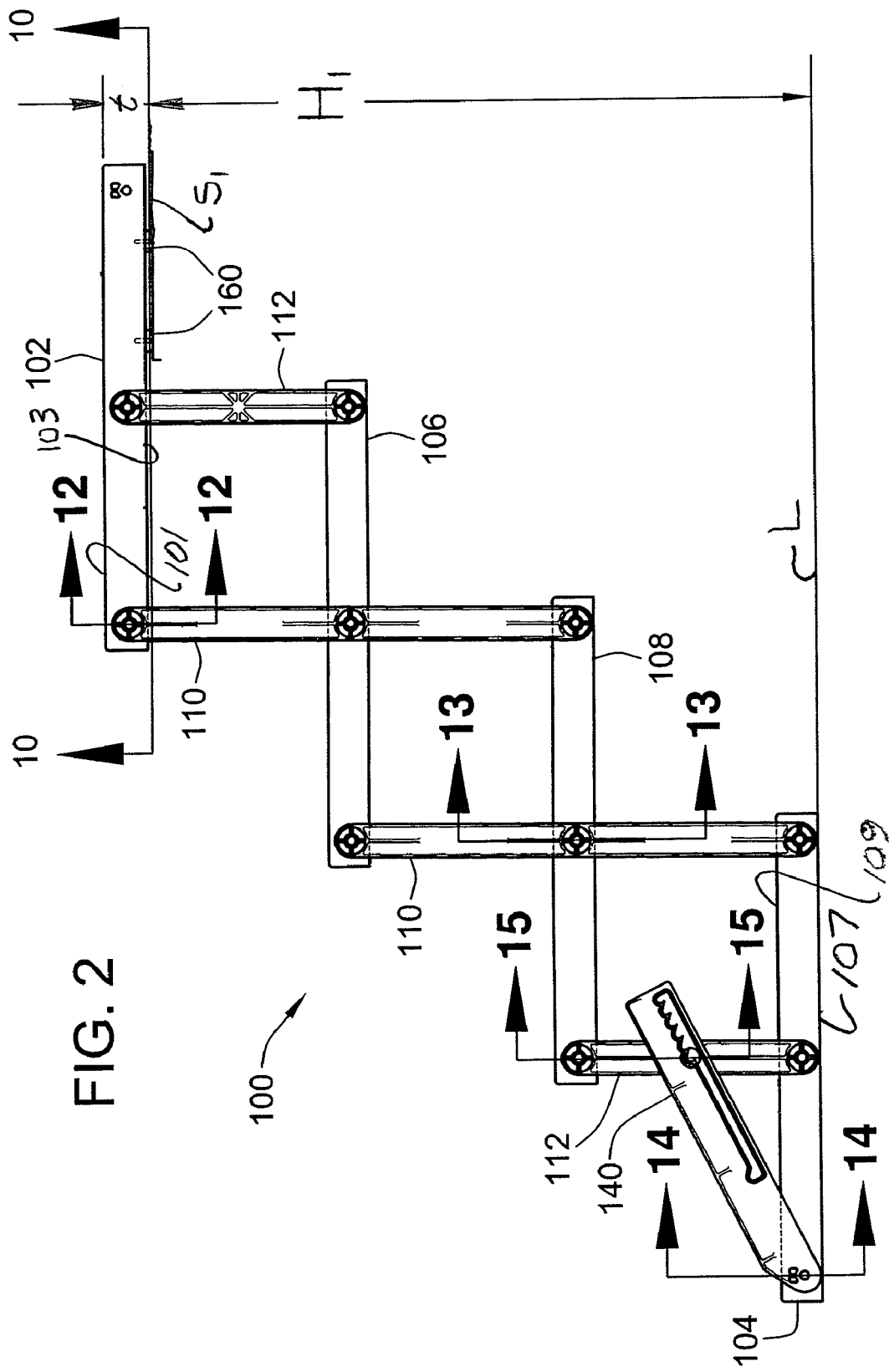

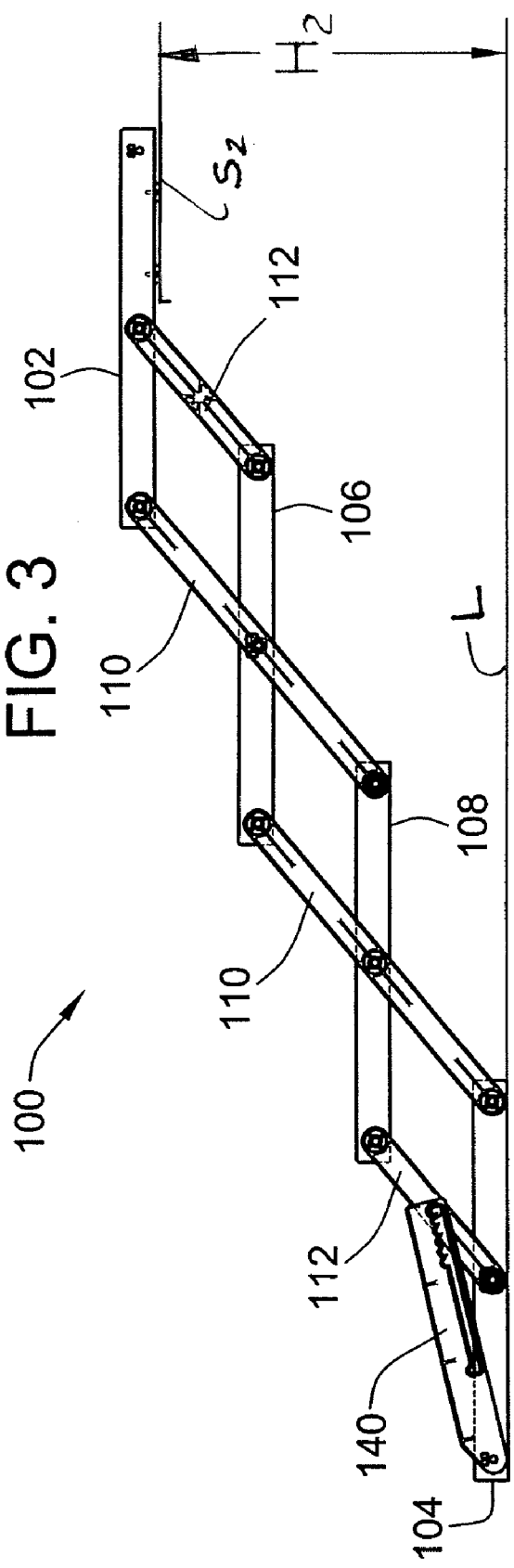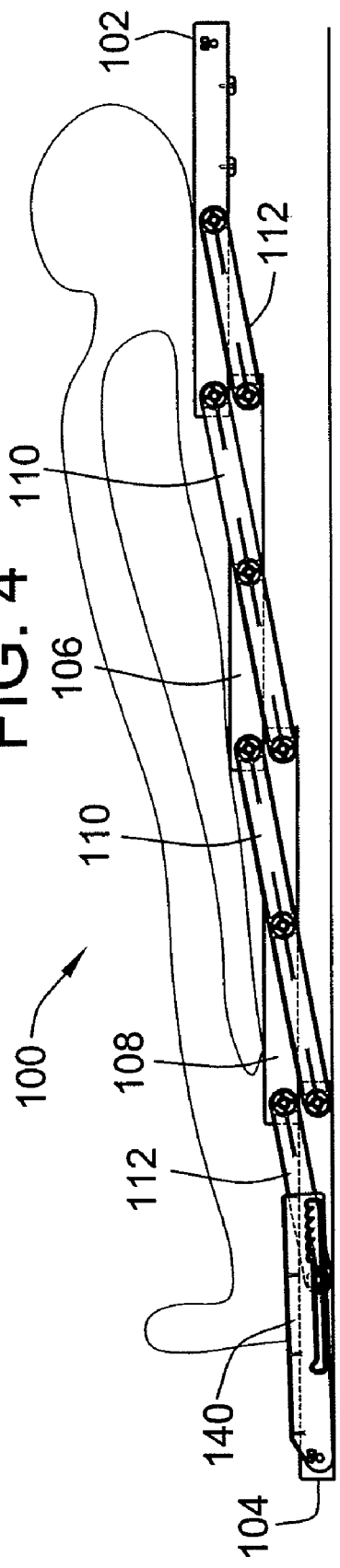

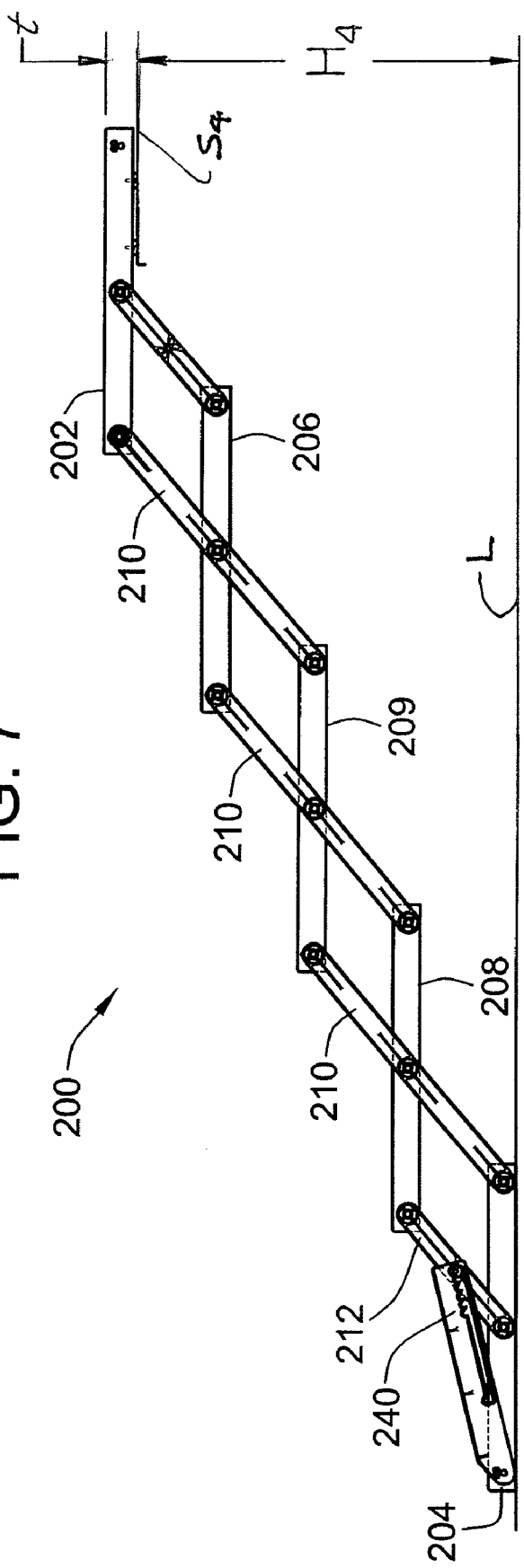

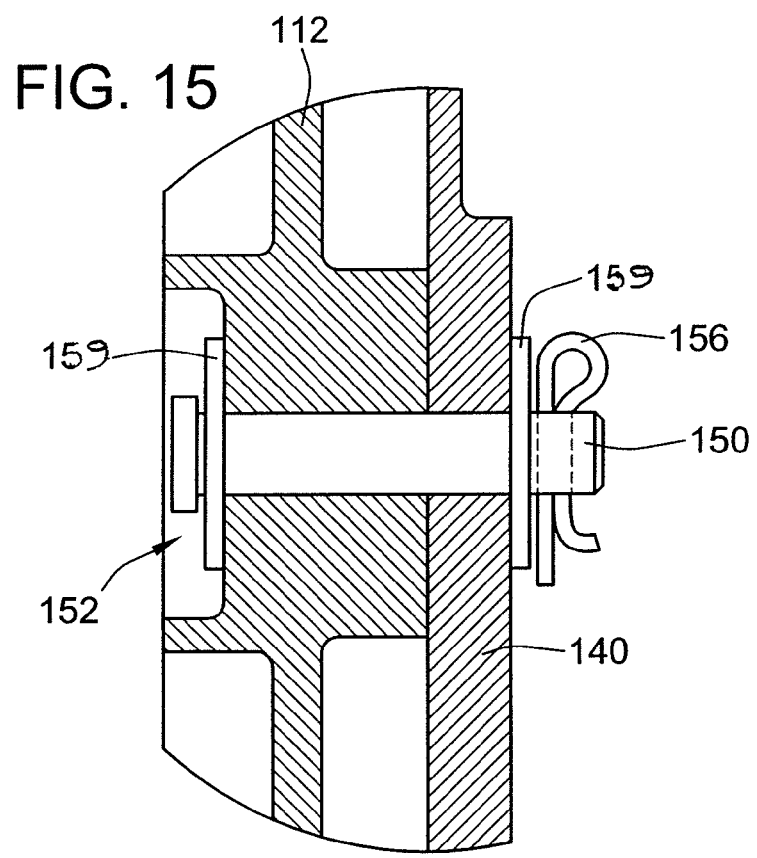
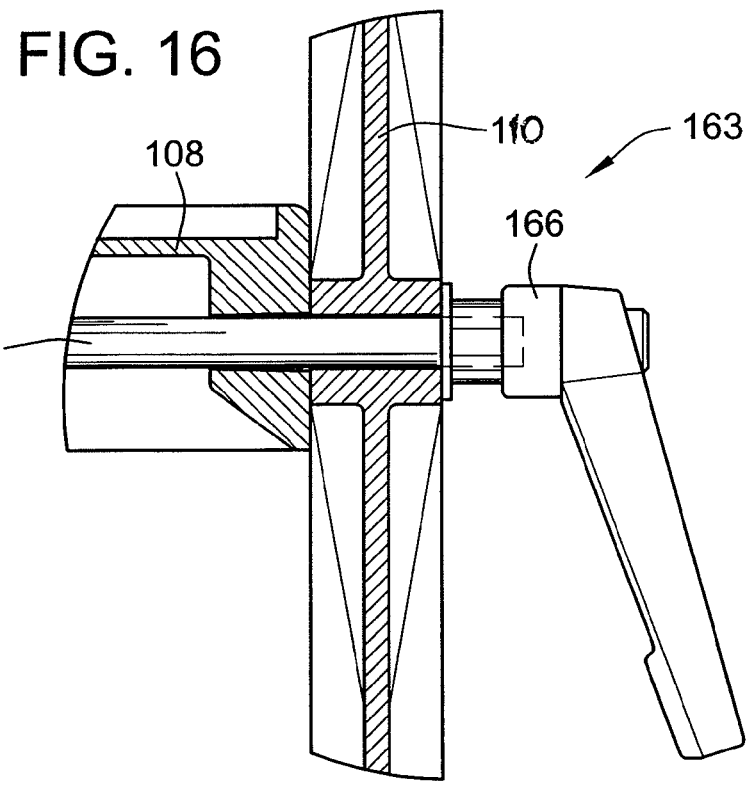

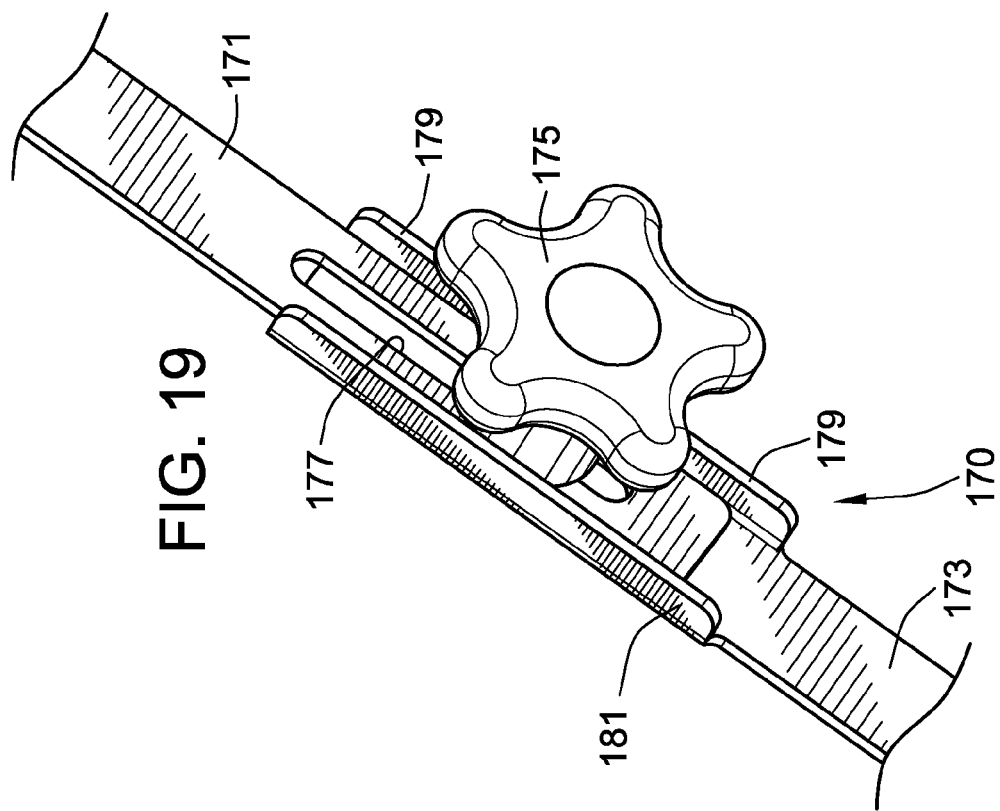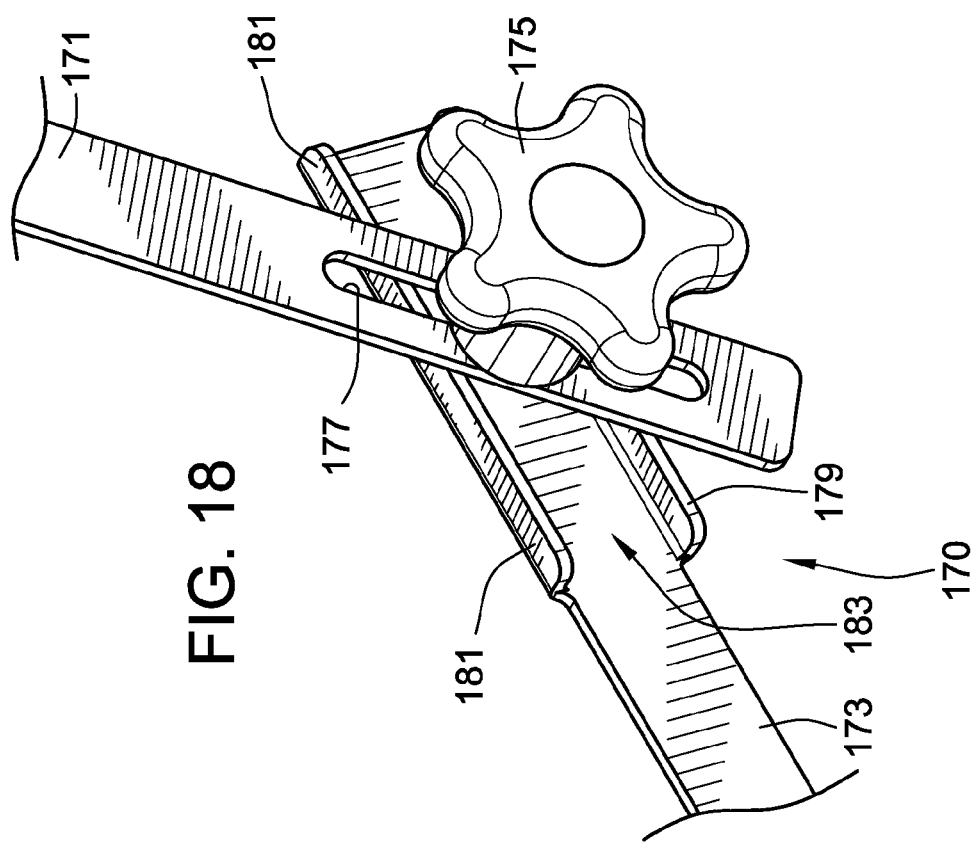

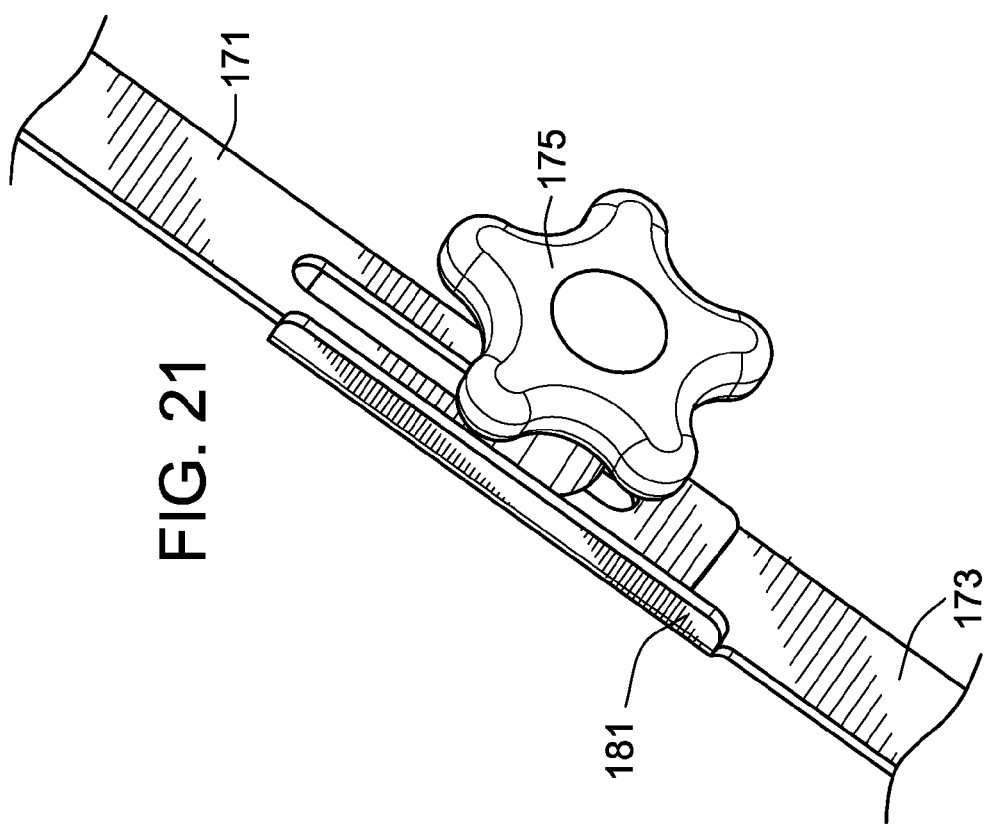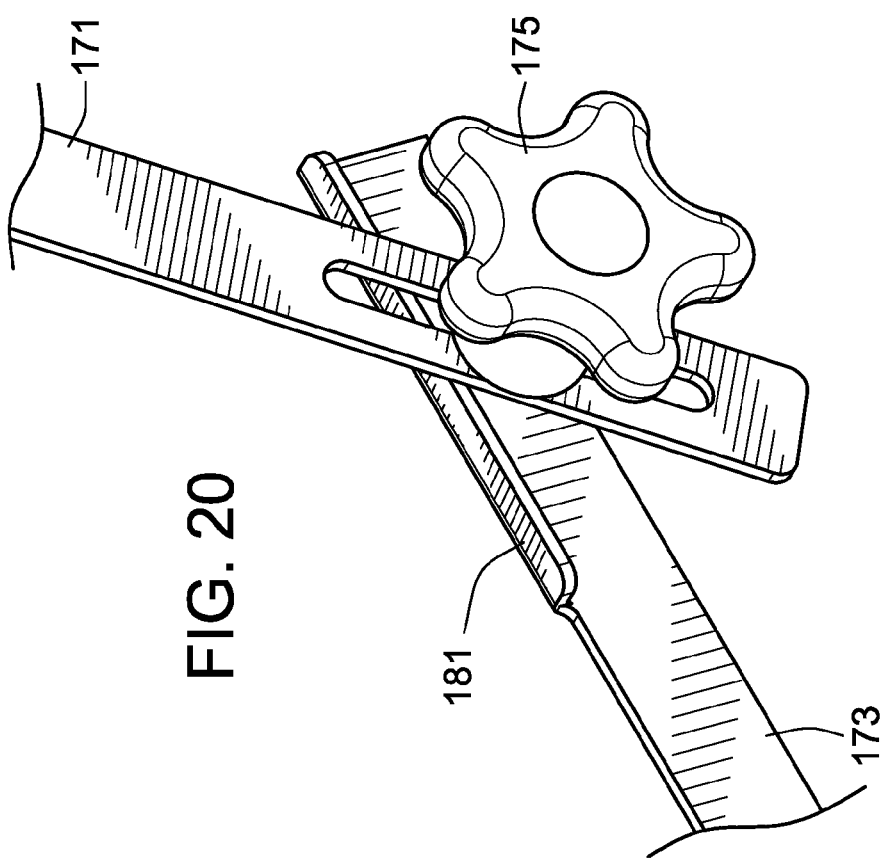

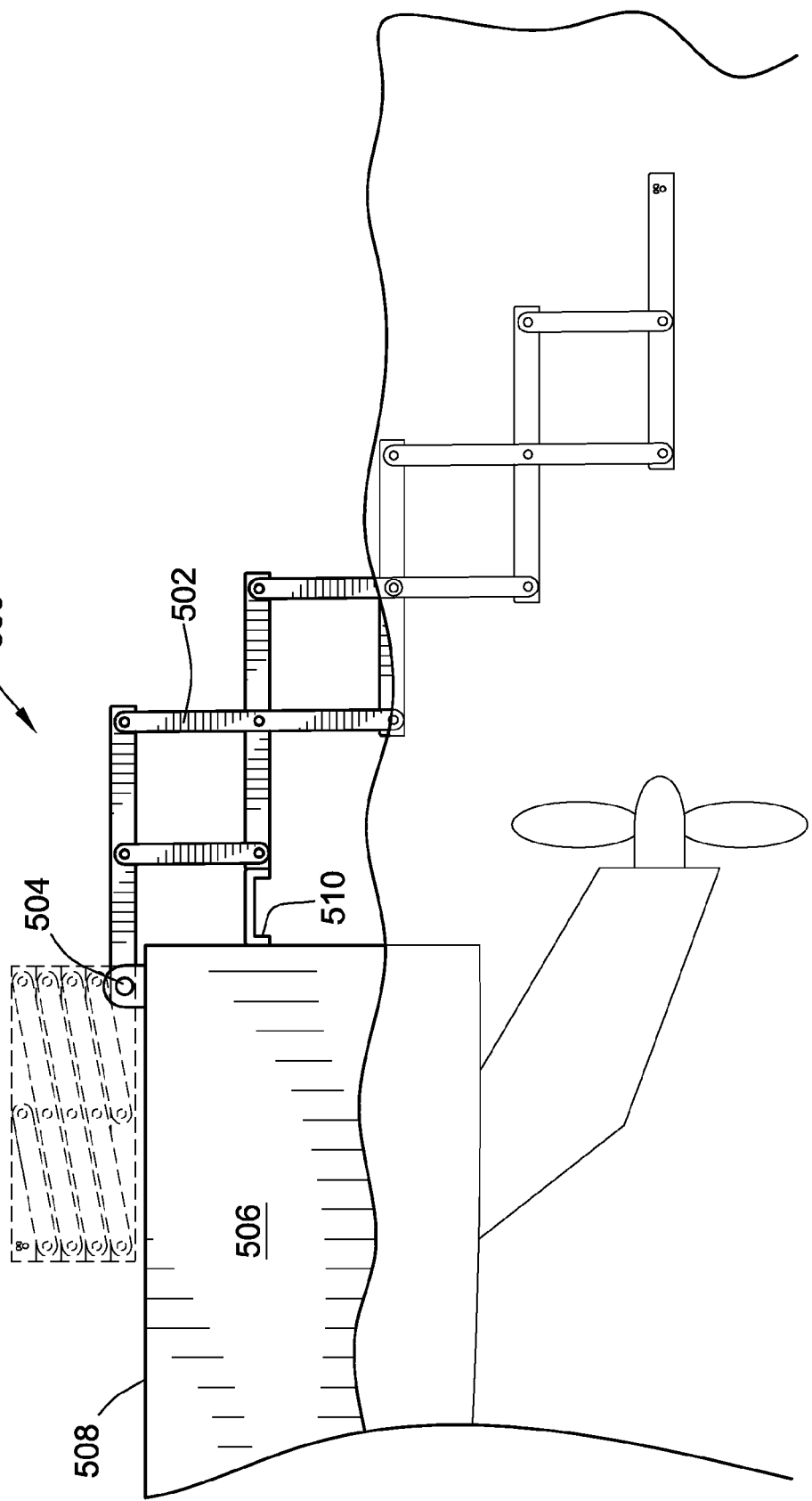

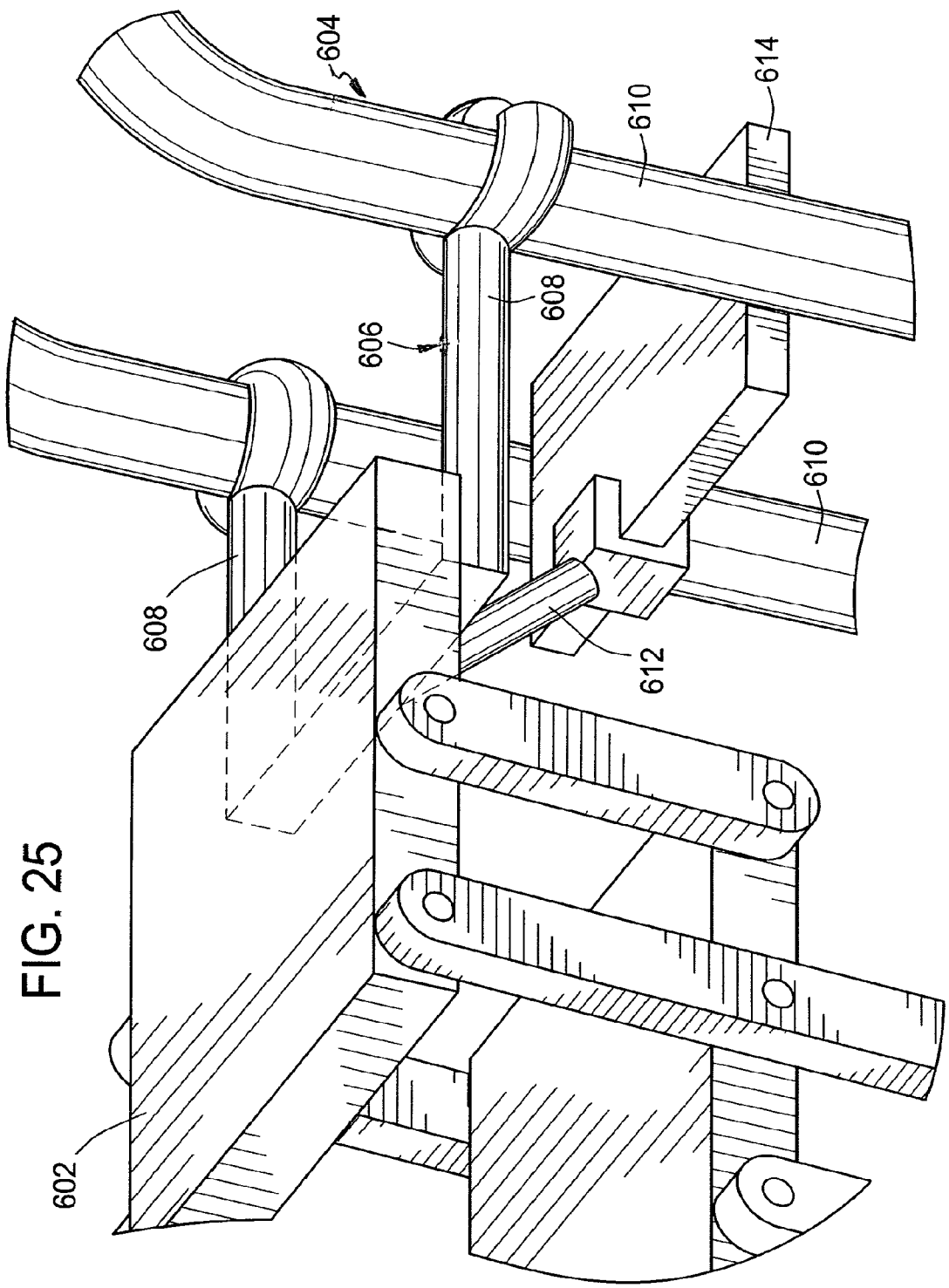

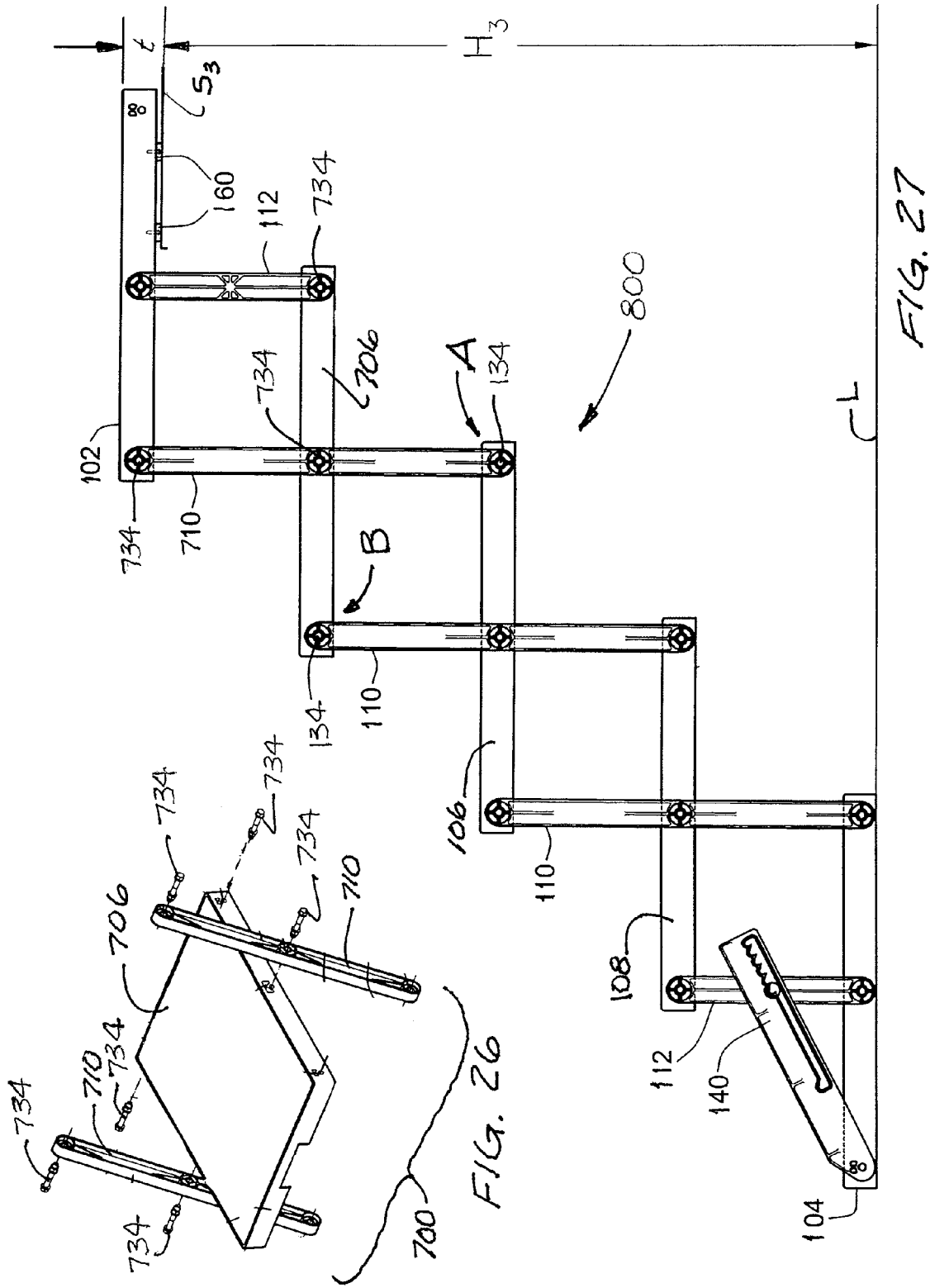

FOLDING PET STAIRCASE

CROSS-REFERENCE TO RELATED PATENT APPLICATIONS

This patent application is a continuation-in-part of co-pending U.S. patent application Ser. No. 11/313,135, filed Dec. 20, 2005, which claims the benefit of U.S. Provisional Patent Application No. 60/639,895, filed Dec. 22, 2004, the disclosure and teachings of which are incorporated herein in their entireties.

FIELD OF THE INVENTION

This invention relates generally to devices which allow pets, such as dogs, to ascend to and descend from elevated surfaces, such as truck beds, vehicle interiors, or tables used for veterinary or grooming services, under their power without the need for jumping or being lifted, and more particularly to a foldable staircase for use by pets.

BACKGROUND OF THE INVENTION

There is a need for a device that allows pets, such as large dogs, to walk up to and down from elevated surfaces, so that the pet is not required to risk injury while jumping up to or down from the elevated surface, and so that a pet owner or handler is not required to risk injury to either the pet or himself/herself in attempting to lift the pet up to or down from the elevated surface. It is also desirable that the device be lightweight, and collapsible to a compact folded size so that it may be easily transported and handled by persons carrying or setting up the device. It is further desirable that the device be capable of quick adjustment to operate between surfaces that are located at various heights from one another.

Prior devices involving fixed or folding ramps do not work well for use in meeting the above described needs for several reasons. First, pets such as dogs have difficulty in walking down a ramp, and tend to walk off the edge of the ramp, because they cannot see the ramp below them. The angle of ascent/descent of a ramp which can be readily negotiated by the pet must typically be rather shallow, making the ramp too long to be useable in tight spaces, and difficult to stow, particularly if the ramp is not foldable to less than its fully extended length.

Experience has shown that devices using steps work better than devices using ramps, because pets become acclimated to negotiating steps during day-to-day activities. Experience has also shown that pets can easily negotiate substantially steeper angles of ascent and descent while using staircase-type devices. The steeper angle of ascent and descent and construction of staircase-type devices also helps pets to ascend or descend, without walking off of the edges of the steps, because the animal can see the steps above and below them, while ascending or descending, more readily than they can see a ramp surface. The greater angle of ascent/descent also allows a device using steps to be shorter than a ramp would be for a given difference in elevation between the elevated surface and the floor or ground.

Prior devices using steps, however, whether rigid or folding, fall short of meeting the needs and desirable attributes described above. It is desirable, therefore, to provide an improved apparatus and method for allowing pets to ascend to and descend from an elevated surface, in a manner that better fulfills one or more of the needs and desirable attributes described above.

BRIEF SUMMARY OF THE INVENTION

The invention provides an improved method and apparatus for allowing pets to ascend to and descend thereupon, through use of a foldable staircase having stair treads operatively connected by articulating links in such a manner that the treads can be pivoted in unison from a stowed position of the staircase, in which the treads are substantially stacked upon one another, to a plurality of extended positions, in which the links position the treads in a spaced and parallel relationship to one another. The foldable staircase may also include a latch for selectively securing the staircase in a selected one of the extended positions. The latch may be configured for preventing further pivoting, once engaged, of the treads in either or both directions between the stowed and extended positions of the staircase.

The treads and articulating links may be configured so that in a fully extended position, the treads form a relatively flat surface, thereby allowing the staircase in the fully extended position to be used as a litter, or stretcher, for transporting a person or an animal. The staircase may also be configured so that the links may be removed and used as splints for stabilizing fractured bones. Where the staircase includes a latch, the latch may be configured for selective disconnection, so that the staircase may be pivoted to the fully extended position only when the latch is disconnected. Alternatively, the latch may be configured for selectively locking the staircase in the fully extended position.

A foldable staircase, according to the invention, may also include a covering for one or more of the treads, such as carpeting or rubber matting. Alternatively, the upper surface of the tread may include an integrally formed non-slip surface.

A foldable staircase, according to the invention, may further include a non-slip element on the underside of one or both of a top and a bottom tread of the staircase. The non-slip element may take many forms, such as a plurality of buttons of a resilient material such as rubber, or a strip or sheet of resilient material attached to the underside of the top and/or bottom tread.

One or more of the treads may include hand-holds for facilitating pivoting the staircase between the stowed position and extended positions. The staircase may be constructed of waterproof or moisture tolerant materials, such as plastic, stainless steel, aluminum, or plated metal, so that the staircase can be used in wet conditions, or for entry into, or egress from, a boat or other watercraft. The treads may also include openings therein for passage of water from a top surface to a bottom surface of the tread.

In one form of the invention, a foldable staircase includes a plurality of treads having opposite side surfaces thereof joined by articulating links that are operatively connected to and disposed adjacently outward from the opposite side surfaces. The staircase may include a top tread, a bottom tread, and one or more intermediate treads, with each tread including three attachment points for the articulating links disposed along the opposite sides, with each tread including a front tread attachment point disposed adjacent the front edge of the tread, a rear tread attachment point disposed adjacent the rear edge of the tread, and an intermediate tread attachment point disposed substantially halfway between the front and rear tread attachment points along each of the opposite edges of the tread.

The intermediate treads are attached to one another, and to the top and bottom treads, by pairs of long links having an intermediate long link connection point pivotably attached to the intermediate tread attachment points of a given intermediate tread, and upper and lower long link connection points disposed at opposite axial ends of the long links. The upper long link connection points are pivotably connected to the front tread attachment points of either the top tread, or another adjacent intermediate tread disposed above the given intermediate tread. The lower long link connection points are attached to the rear tread attachment points of either the bottom tread or another adjacent intermediate tread disposed below the given intermediate tread.

The top tread is further pivotably connected to an adjacent intermediate tread below by a pair of short articulating links. Specifically, the short articulating links each include an upper short link connection point pivotably connected to the intermediate tread attachment point of the top tread, and a lower short link connection point pivotably connected to the rear tread attachment point of the intermediate tread below and adjacent the top step.

In similar fashion, the bottom tread is further pivotably connected to an adjacent intermediate tread above the bottom tread by a second pair of the short articulating links. Specifically, the second pair of short articulating links each include a lower short link connection point pivotably connected to the intermediate tread attachment point of the bottom tread, and an upper short link connection point pivotably connected to the front tread attachment point of the intermediate tread above and adjacent the bottom step.

A foldable staircase, according to the invention, may include one or more latches, which when engaged, secure the staircase in a selected one of the extended positions. When engaged, the latch, or latches, may preclude further pivoting of the articulating links. A latch, or latches, according to the invention, may be operatively connected, at opposite ends thereof, to the intermediate attachment points of two adjacent treads.

In one form of the invention, a foldable staircase may include a pair of latches each having an elongated body including a first end pivotably connected to one of the front tread attachment points of the bottom tread. The body of the latches may also define an elongated slot, extending along a longitudinal axis of the latch, for sliding receipt therein of a pivot member extending outward from a short link mid-link connection point. The slot further includes a series of notches therein for engaging the pivot member to prevent further pivoting of the treads between the stowed and extended positions, to thereby lock the staircase into rigid structure at a selected one of the extended positions.

In some forms of the invention, the pivot member may be selectively disengaged from the short link arm attached to the lower tread, to thereby allow the staircase to be pivoted to the fully extended position for use as a litter or stretcher.

The short articulating links may have a length between the upper and lower short link connection points that is substantially equal to the length between the intermediate long link connection point and both the upper and lower long link connection points of the long articulating links. It may also be desirable, for economy of manufacturing, to have identical short links connecting the top and bottom treads to the intermediate treads, with all short links including the mid-link connection point for receiving the pivot member.

The short and long articulating links may be pivotably attached to the treads by threaded fasteners, such as shoulder bolts, which provide a controlled clearance fit to facilitate articulation of the links with respect to the treads. The pivot member may include a clevis pin extending through the short link attached to the bottom tread and the slot in the latch, and held in place by a cotter pin extending through a cross-drilled hole in the end of the clevis pin. A washer may be provided inboard of the nuts on the links and/or the cotter pin, to spread contact loads into the links, the latches and the treads.

In another form of the invention, a foldable staircase apparatus is provided, which includes a foldable staircase, as described above, and a staircase holder adapted for receiving the staircase in the stowed position. The holder may be adapted for attachment to a surface, such as the tailgate of a truck or a sport utility vehicle, or a trunk lid of a vehicle.

A foldable staircase apparatus, according to the invention may also include a foldable staircase, as described above, and a mounting bracket for pivotably attaching the staircase to a vehicle, a watercraft, or a table, so that the staircase may be pivoted about the mounting bracket in either or both of the stowed and extended positions of the staircase.

An apparatus, according to the invention, may also take the form of a kit including one or more additional treads, and additional intermediate links and connection hardware for increasing the number of treads in the staircase so that the staircase can be used to allow the pet to ascend or descend greater distances while traversing the staircase.

The treads of a staircase, according to the invention, may also be configured to have a great enough depth, between the front and rear edges thereof, so that a pet ascending the staircase cannot see an open space between the treads.

The invention may also take the form of a method for constructing a foldable staircase, according to the invention, or a method for using a foldable staircase in a manner in accordance with the invention.

Other aspects, objectives and advantages of the invention will become more apparent from the following description of the invention, in conjunction with the accompanying drawings.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a right side view of the foldable staircase of FIG. 1, latched in the highest extended position.

FIG. 3 is right side view of the foldable staircase of FIG. 1, latched in a lowest extended position.

FIG. 4 is right side view of the foldable staircase of FIG. 1, in a fully extended position, with the latch disconnected.

FIG. 7 is right side view of the foldable staircase of FIG. 6, latched in a lowest extended position.

FIGS. 12-15 are enlarged cross-sectional views showing connections between the components of the foldable staircases of FIGS. 1-8B, taken along lines as indicated in FIG. 2.

FIG. 16 is an alternate embodiment of a latch, for a foldable staircase, according to the invention.

FIGS. 18-21 are enlarged perspective illustrations of a portion of the latch, of the embodiment shown in FIG. 17, illustrating various details of the construction and operation of alternate embodiments of the latch shown in FIG. 17.

FIG. 24 shows an exemplary embodiment of the invention, having a foldable staircase pivotably attached by a mounting bracket to a watercraft.

FIG. 25 shows an exemplary embodiment of the invention having a foldable staircase and a mounting bracket for clamping the foldable staircase to a ladder of the type extending over the edge of a watercraft, or positioned along the edge of a swimming pool, pier, or dock.

FIG. 26 is an exploded perspective illustration of an extension kit apparatus, according to the invention.

FIG. 27 is a right side view of an extended foldable staircase, illustrating the manner in which the extension kit apparatus shown in FIG. 26 can be utilized for adding an extra step to the foldable staircase of FIG. 2 and increasing the maximum working height of the foldable staircase shown in FIG. 2.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
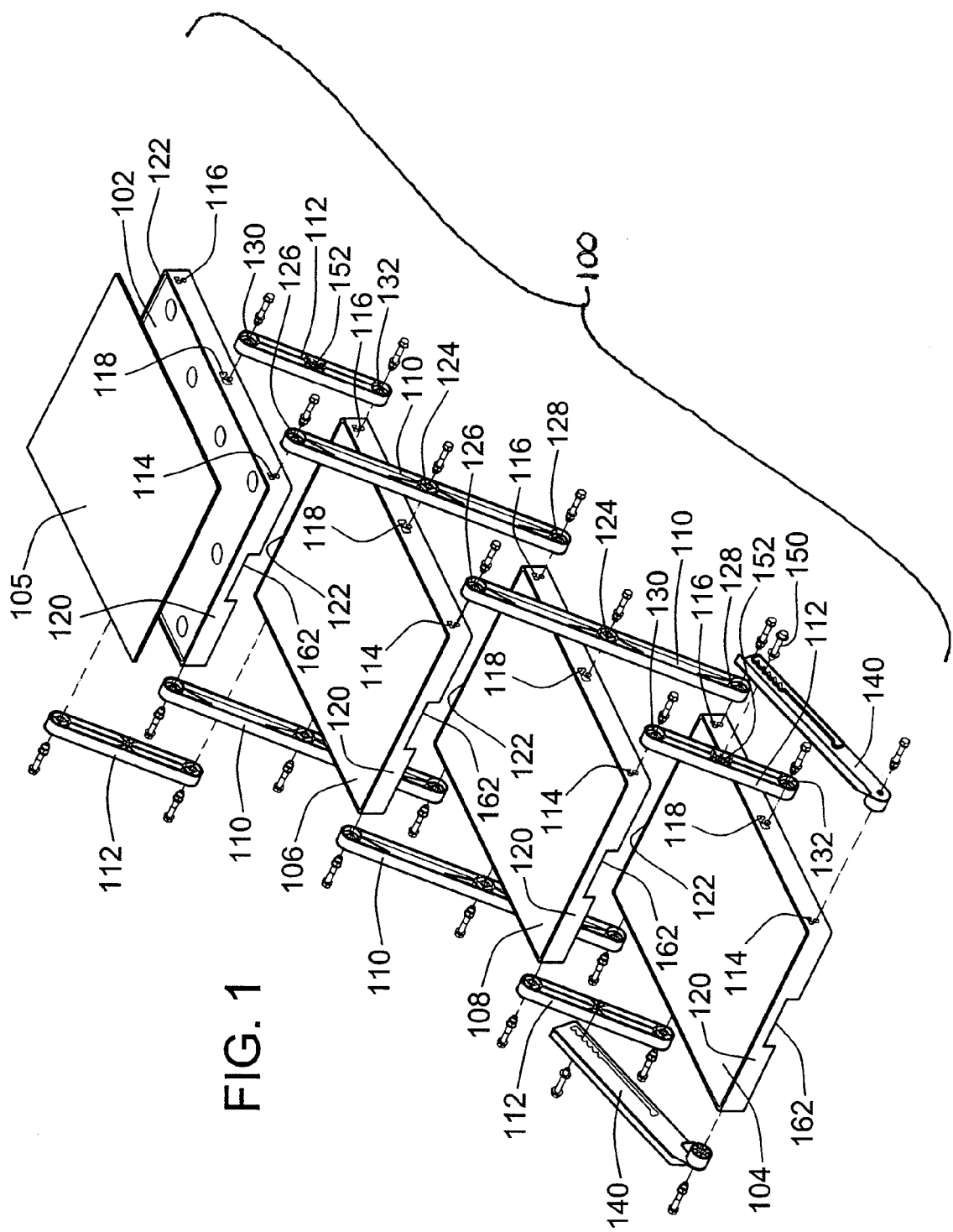
FIG. 1 is a perspective exploded view of a first exemplary embodiment of a foldable staircase, according to the invention, having four treads and a pair of latches for selectively securing the staircase in one of several extended positions.

FIG. 1 shows a first exemplary embodiment of the invention, in the form of a foldable staircase 100 including a plurality of treads 102, 104, 106, 108 having opposite side surfaces thereof joined by articulating links 110, 112 that are operatively connected to and disposed adjacently outward from the opposite side surfaces of the treads 102, 104, 106, 108. Specifically, the staircase 100 includes a top tread 102, a bottom tread 104, an upper intermediate tread 106 and a lower intermediate tread 108. It will be noted that all of the treads 102, 104, 106, 108 of the exemplary embodiment are identical, but this is not a requirement of the invention. It will further be noted that all of the treads 102, 104, 106, 108 include a carpet piece 105 attached to the upper surface of the treads 102, 104, 106, 108, but other embodiments of the invention may use different treatments of the top surfaces of the treads 102, 104, 106, 108.

Each tread 102, 104, 106, 108 includes three attachment points 114, 116, 118 for the articulating links 110, 112 disposed along the opposite sides, with only selected ones of the attachment points along the right side (as shown in FIG. 1) of the foldable staircase 100 being labeled with reference numerals in FIG. 1, for clarity of illustration. Specifically, each of the treads 102, 104, 106, 108 includes a front tread attachment point 114 disposed adjacent the front edge 120 of the tread 102, 104, 106, 108, a rear tread attachment point 116 disposed adjacent the rear edge 122 of the tread 102, 104, 106, 108, and an intermediate tread attachment point 118 disposed substantially halfway between the front and rear tread attachment points 114, 116 along each of the opposite edges of the tread 102, 104, 106, 108.

The intermediate treads 106, 108 are attached to one another by a two pairs of long links 110 having an intermediate long link connection point 124 pivotably attached to the intermediate tread attachment points 118 of the upper and lower intermediate treads 106, 108, and upper and lower long link connection points 126, 128 disposed at opposite axial ends of the long links 110. The upper long link connection points 126 of the long links 110 connected to the intermediate tread attachment points 118 of the upper intermediate tread 106 are pivotably connected to the front tread attachment points 114 of the top tread 102, and the lower long link connection points 128 of the long links 110 connected to the intermediate tread attachment points 118 of the upper intermediate tread 106 are pivotably connected to the rear tread attachment points 116 of the lower intermediate tread 108.

In similar fashion, the upper long link connection points 126 of the long links 110 connected to the intermediate tread attachment points 118 of the lower intermediate tread 108 are pivotably connected to the front tread attachment points 114 of the upper intermediate tread 106, and the lower long link connection points 128 of the long links 110 connected to the intermediate tread attachment points 118 of the lower intermediate tread 108 are pivotably connected to the rear tread attachment points 114 of the bottom tread 104.

The top tread 102 is further pivotably connected to the upper intermediate tread 106 by a pair of short articulating links 112. Specifically, the short articulating links 112 each include an upper short link connection point 130 pivotably connected to the intermediate tread attachment point 118 of the top tread 102, and a lower short link 132 connection point pivotably connected to the rear tread attachment point 116 of the upper intermediate tread 106.

In similar fashion, the bottom tread 104 is further pivotably connected to the lower intermediate tread 108 by a second pair of the short articulating links 112. Specifically, the short articulating links 112 attached to the bottom tread 104 each include an upper short link connection point 130 pivotably connected to the front tread attachment point 114 of the lower intermediate tread 108, and a lower short link 132 connection point pivotably connected to the intermediate tread attachment point 118 of the bottom tread 104.

As shown in FIGS. 12-15, the short and long articulating links 110, 112 are be pivotably attached to the treads 102, 104, 106, 108 by threaded connections including shoulder bolts 134 secured by locking nuts 136, which provide a controlled clearance fit to facilitate articulation of the links 110, 112 with respect to the treads 102, 104, 106, 108. Washers 138 are provided, inboard of the locking nuts 136 and the head of the shoulder bolts 134, to spread contact loads into the links 110, 112 and the treads 102, 104, 106, 108.

Figure 9:
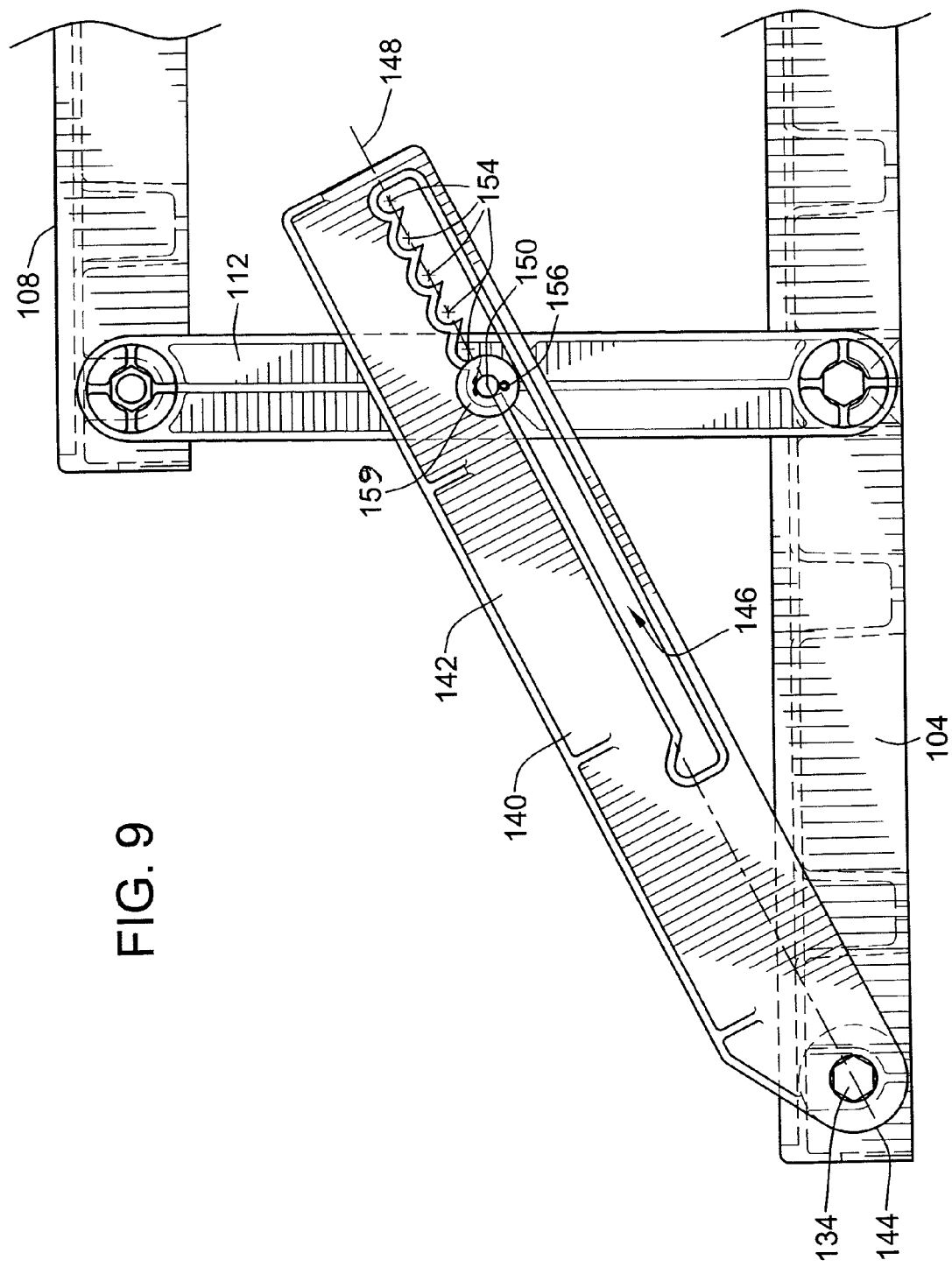
FIG. 9 is an enlarged right side view of a latch of the foldable staircases of FIGS. 1-8B.
Figure 14:
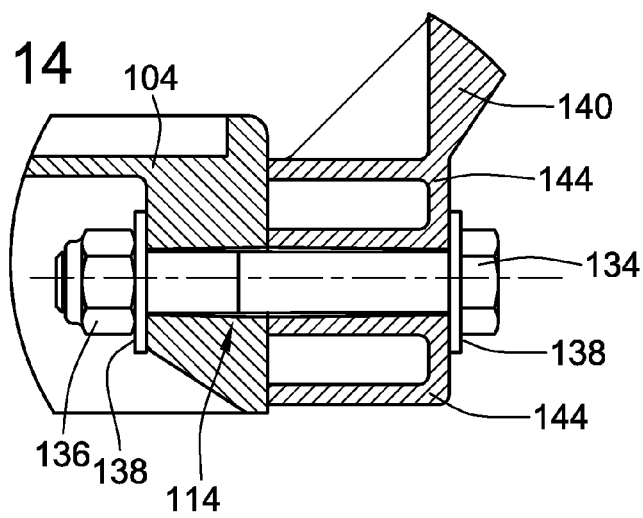

The first exemplary embodiment of the foldable staircase 100 includes a pair of latches 140, as shown in FIGS. 1-4 and FIG. 9, each having an elongated body 142 including a first end 144 pivotably connected to one of the front tread attachment points 114 of the bottom tread 104, by a threaded connection as shown in FIG. 14, including a bolt 134, a locking nut 136 and a pair of washers 138. The body 142 of the latches 140 also defines an elongated slot 146, extending parallel to a longitudinal axis 148 of the latch 140, for sliding receipt therein, as shown in FIGS. 9 and 15 of a pivot member, in the form of a clevis pin 150 extending outward from a short link mid-link connection point 152 in the short links 110 attached to the bottom tread 104. The slot 146 further includes a series of notches 154 therein for engaging the clevis pin 150, to prevent further pivoting of the treads 102, 104, 106, 108 between the stowed and extended positions, to thereby lock the staircase 100 into rigid structure at a selected one of the extended positions.

Figure 28:
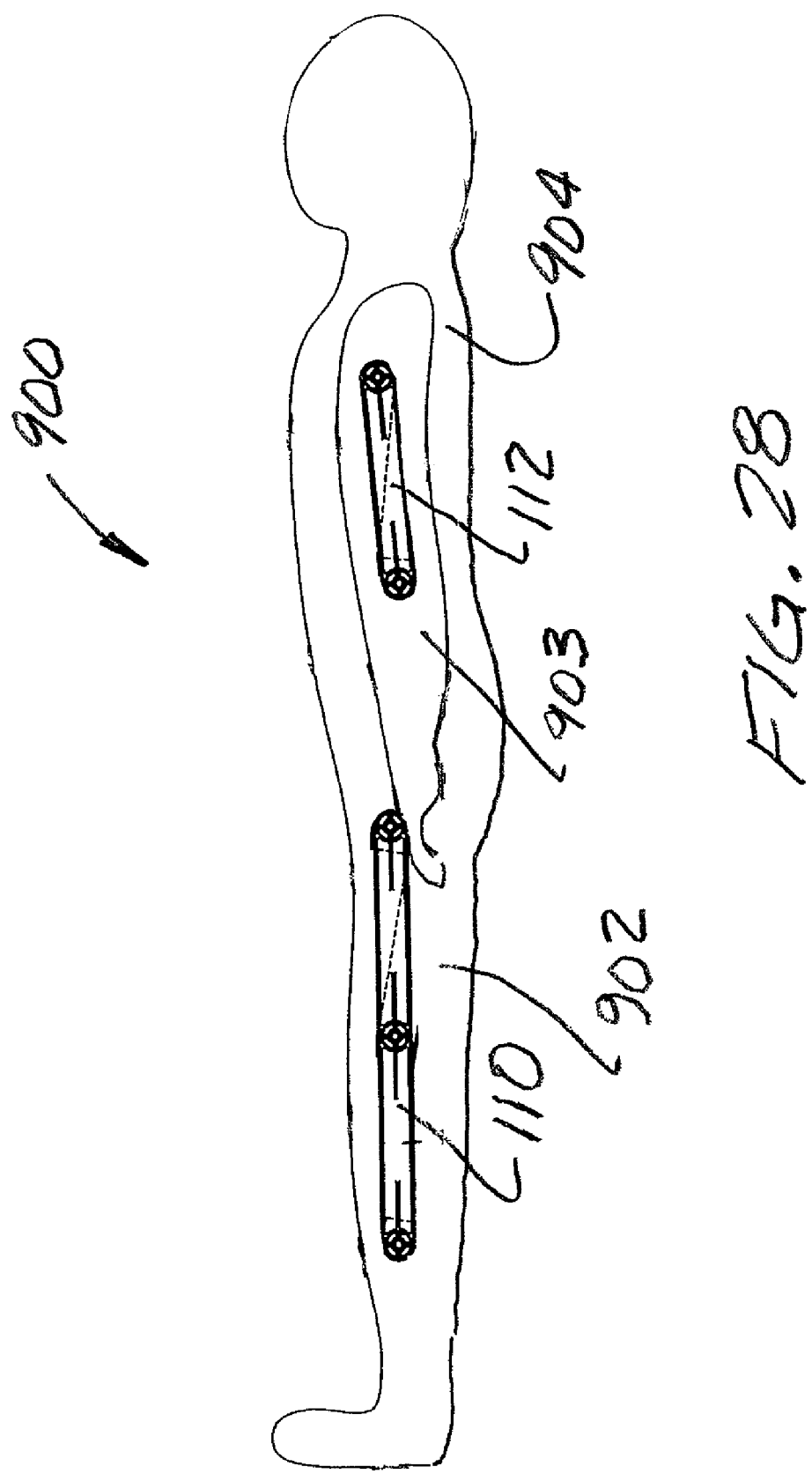
FIG. 28 shows an embodiment of the invention in which articulating lengths removed from the foldable staircase of FIG. 2 or FIG. 6 are removed from the staircase and utilized as splints for stabilizing fractured bones of an injured person.

The clevis pin 150 is secured by a cotter pin 156 extending through a cross-drilled hole in the end of the clevis pin 150. Washers 159 provided inboard of the head of the clevis pin 150 and the cotter pin 156, to spread contact loads into the links 112 and the latches 140. By removing the cotter pin 156, the clevis pin 150 may be selectively disengaged from the short link arm 112 attached to the lower tread 104, to thereby allow the staircase 100 to be pivoted to the fully extended position for use as a litter or stretcher. As shown in FIG. 28, in an embodiment 900 of the invention, one or more of the short and long articulating links 112, 110 may be detached from the foldable staircase 100, by removing the shoulder bolts 134 attaching the short and long articulating links 112, 110 to one of the treads 102, 104, 106, 108, and using the detached articulating links 110, 112 as splints for supporting broken bones in the leg 902 or arm 903, for example, of an injured person 904.

The short articulating links 112 of the exemplary embodiment have a length between the upper and lower short link connection points 130, 132 that is substantially equal to the length between the intermediate long link connection point 124 and both the upper and lower long link connection points 126, 128 of the long articulating links 110. For economy of manufacturing, the short links 110 connecting the top and bottom treads 102, 104 to the intermediate treads 106, 108 are identical, with all of the short links 112 attached to both the top and bottom treads 102, 104 including the mid-link connection point 152 for receiving the clevis pin 150.

As will be seen from examining the drawings, the treads 102, 104, 106, 108, the short and long articulating links 110, 112, and the latches 140 are all configured in the exemplary embodiment to include reinforcing ribs, to provide lightweight but rigid structural members. The treads 102, 104, 106, 108, the short and long articulating links 110, 112, and the latches 140 may be made from a variety of materials, such as metal, plastic, or composite materials, fabricated by a wide variety of methods. In the first exemplary embodiment of the foldable staircase 100 described above, it is contemplated that the treads 102, 104, 106, 108, the short and long articulating links 110,112 and the latches 140 are preferably formed form a molded plastic or composite material.

Figure 10:
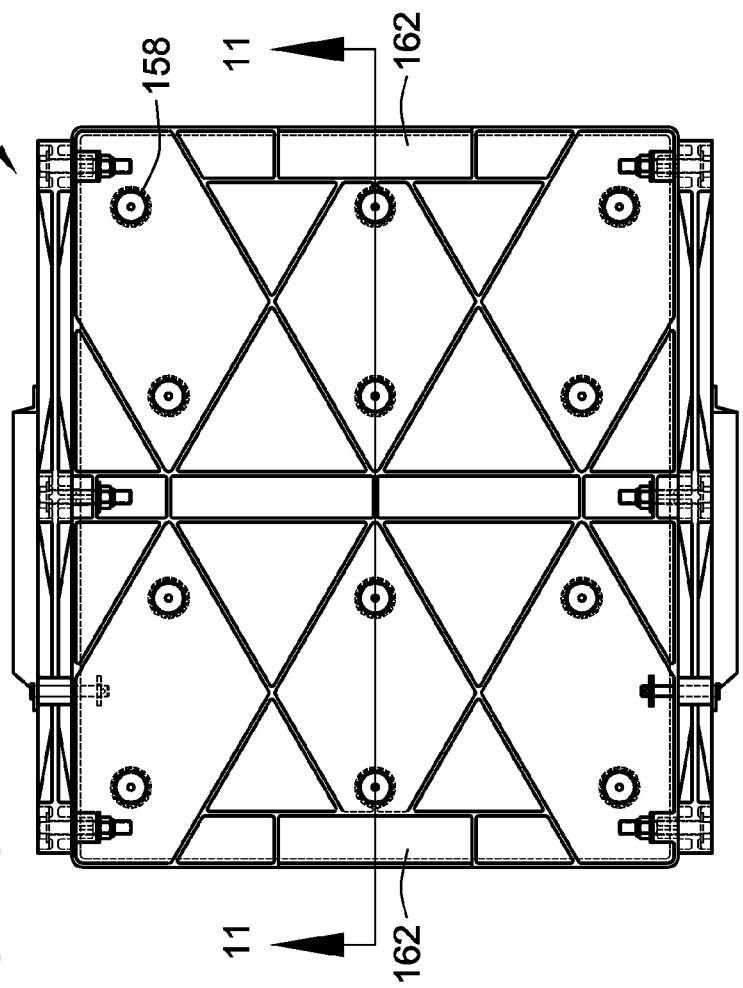
FIGS. 10 and 11 are bottom and cross sectional views respectively, of the treads of the foldable staircases of FIGS. 1-9.
Figure 11:
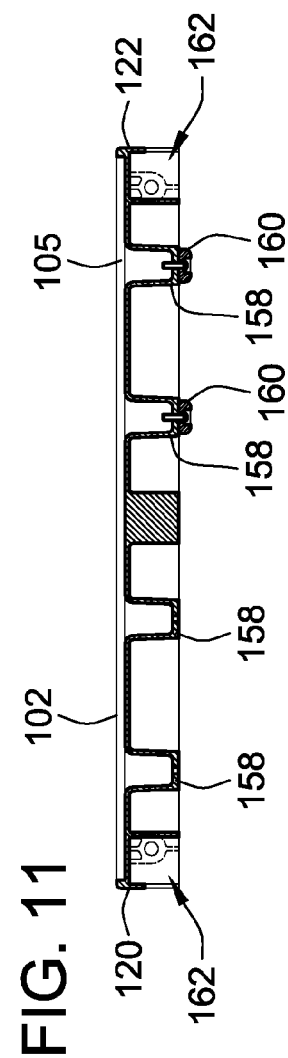
Figure 12:
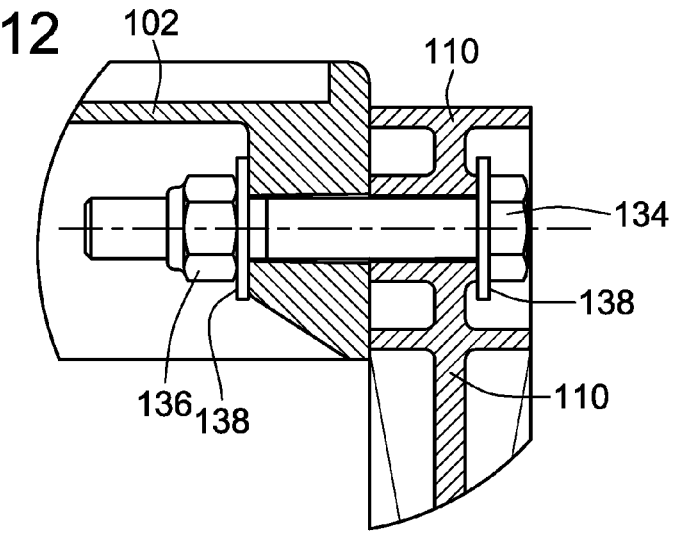
Figure 13:
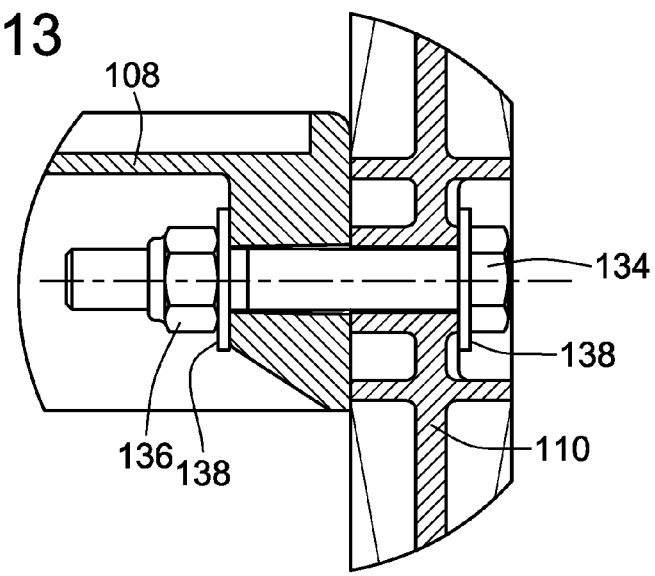

As shown in FIGS. 10 and 11, the treads 102, 104, 106, 108 also include a plurality of regularly spaced cup-shaped segments 158 extending downward from the step surface of the treads 102, 104, 106, 108. These cup-shaped segments 158, in the exemplary embodiment, are configured generally as right circular cylinders, with open tops and closed bottoms, but with the closed bottoms having a through hole centrally located therein. The through-holes in the cup-shaped segments 158 serve dual functions by letting water flow through the treads 102, 104, 106, 108, and by allowing attachment of components to the treads 102, 104, 106, 108. Specifically, as shown in FIG. 11, anti skid buttons 160 are attached to the underside of the top tread 102, by means of the through holes in the cup-shaped segments 158, to provide stability for the upper end of the staircase 100 when it is resting on an elevated surface.

As further shown in FIGS. 1, 10 and 11, the front and rear edges of the treads 102, 104, 106, 108 also include integrally formed hand-holds 162 to facilitate pivoting the treads 102, 104, 106, 108 between the stowed and extended positions.

As shown in FIG. 2, a first exemplary embodiment of the foldable pet staircase is illustrated in its highest extended position, for assisting a pet in ascending and descending thereupon between a substantially horizontally extending lower surface L and a substantially horizontal elevated surface $S_1$ disposed at a vertical distance HI from one another. Both the top and bottom stair treads 102, 104 have respective undersides 103, 107 configured such that at least a portion of the underside 107 of the bottom stair tread 104 is adapted to rest upon the lower surface L and at least a portion of the underside 103 of the top tread 102 is adapted to rest upon the elevated surface $S_1$. The top and bottom stair treads 102, 104 each also have a respective top surface 101, 109 and a respective edge thereof extending between the respective top surface and underside of each of the top and bottom stair treads 102, 104. The edges of the top and bottom stair treads 102, 104 substantially define a thickness "t" of the top and bottom stair treads 102, 104 that is substantially smaller than the vertical distance HI between the elevated and lower surfaces $S_1$, L, such that, when the portions of the undersides 103, 107 of the top and bottom stair treads 102, 104 are resting on the elevated and lower surfaces $S_1$, L, respectively, the top surfaces 101, 109 of the top and bottom stair treads 102, 104 are substantially co-planar with the elevated and lower surfaces $S_1$, L, respectively, and are offset therefrom by substantially only the thickness "t" of the stair treads 102, 104 so that a pet traversing the foldable staircase 100 perceives the top surfaces 101, 109 of the top and bottom stair treads 102, 104 as being essentially extensions of the elevated and lower surfaces $S_1$, L, respectively. As will be understood by those having skill in the art, because the treads 102, 104, 106, 108 are oriented substantially horizontally and the articulating lengths 110, 112 are all oriented vertically, in the fully extended position shown in FIG. 2, the vertical distance $H_1$ defines the maximum height at which the foldable staircase 100 can be utilized with the treads 102, 104, 106, 108 being horizontal. Attempting to utilize the first embodiment of the foldable staircase 100 at a vertical height greater than HI would require that the treads 102, 104, 106, 108 be tilted at an angle, which would tend to make the foldable staircase 100 begin to resemble a ramp, which is undesirable for reasons laid out above in the background section.

FIGS. 6, 7 and 8A-8B, show a second exemplary embodiment of the invention in the form of a foldable staircase 200 having 5 treads, rather than 4 treads, but otherwise identical to the first exemplary embodiment of a foldable staircase 100 described above. Specifically, the second exemplary embodiment of a foldable staircase 200, according to the invention, includes a top tread 202, a bottom tread 204, an upper intermediate tread 206, a lower intermediate tread 210, and a middle intermediate tread 209, operatively connected by on opposite sides (only the right side being shown in the drawings) by pairs of long articulating links 210 and short articulating links 212, and having a pair of latches 240, with the construction and operative connection of components of the second exemplary embodiment of a foldable staircase 200 being the same manner as described above in relation to the first exemplary embodiment. In the same manner as discussed above with regard to FIG. 2, when the second exemplary embodiment of the foldable pet staircase 200 is deployed in the manner shown in FIG. 6, with the treads 202, 204, 206, 208, 209 oriented horizontally and the articulating links 210, 212 oriented vertically, the second exemplary embodiment of the foldable staircase 200 allows the foldable staircase 200 to be used by a pet traversing between the lower surface L and an elevated surface $S_3$ which is spaced at a greater vertical distance $H_3$ from the lower surface L than could be reached by the first exemplary embodiment of the folding staircase 100 shown in FIG. 2. As was the case with the first exemplary embodiment of the foldable staircase 100, the top and bottom treads 202, 204 of the second exemplary embodiment of the foldable pet staircase have a thickness "t" which is substantially smaller than the vertical distance $H_3$, such that a pet traversing the second exemplary embodiment of the foldable pet staircase 200 perceives the top surfaces of the top and bottom stair treads as being essentially extensions of the elevated and lower surfaces $S_3$, L, respectively.

FIG. 26 shows an exemplary embodiment of an extension kit apparatus 700, according to the invention, which includes an additional stair tread 706, a pair of long articulating links 710, 710 and six threaded fasteners 734. FIG. 27 illustrates the manner in which the extension kit 700 may be utilized for converting the first exemplary embodiment of the foldable staircase 100 into an extended version 800 thereof (which is essentially identical to the second exemplary embodiment of the foldable staircase 200) by inserting the extension kit 700 between the top tread 102 and the adjacent intermediate thread 106 of the first exemplary embodiment of the foldable staircase 100. Specifically, the four threaded fasteners 134 located at junctures A and B of the first exemplary embodiment 100 of the foldable staircase are removed, such that the top tread 102 and the short articulating link 112 attached thereto can be removed and lifted free of the remainder of the foldable staircase 100. The extension kit 700 is then bolted in place at the location formally occupied by the top tread 102 using the four previously removed threaded fasteners 134 that formerly held the top tread 102 in place, together with two of the threaded fasteners 734 of the extension kit 700. The remaining four fasteners 734 of the extension kit 700 are then utilized to reattach the top tread 102, with the result being the formation of an extended foldable staircase 800 being formed which has a maximum vertical height of $H_3$ that is greater than the shorter maximum vertical height of $H_1$ of the first exemplary embodiment of the foldable staircase 100 prior to the addition thereto of the extension kit 700. It will be appreciated that the ability to add, or remove treads to a foldable pet staircase, according to the invention, provides a significant advantage in that a pet staircase originally purchased for use with a vehicle having a low cargo deck height, such as a minivan, can be reconfigured for use with another vehicle having a substantially higher cargo deck, such as a pick-up truck or an SUV.

FIG. 16 shows a first alternate embodiment of a latch apparatus 163, according to the invention, for locking the treads of a foldable according to the invention, into a desired stowed or extended position. The latch apparatus 163 includes a tie bolt 164 and lever-nut 166, which replace the shoulder bolts 134 and nuts 136, etc., along the opposite sides of at least one of the treads, at one of the tread attachment points. By tightening the lever-nut 166, the articulating links are compressed against the tread at the tread attachment point to lock the treads in a given position. The treads may be pivoted to a different position by loosening the lever-nut 166.

Figure 17:
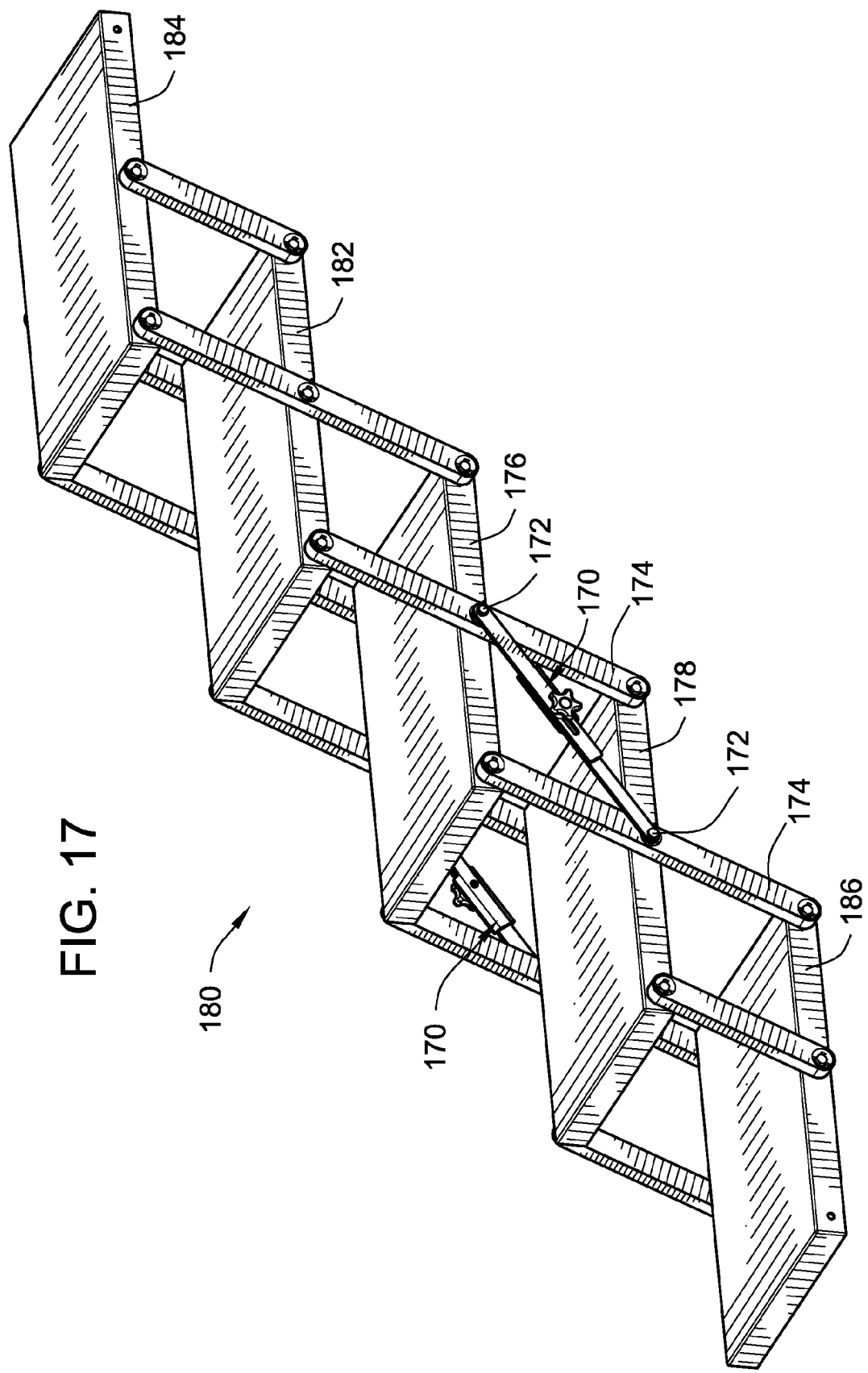
FIG. 17 is a perspective view of an alternate exemplary embodiment of a foldable staircase, according to the invention, showing a second exemplary embodiment of a latch, according to the invention.

Those having skill in the art will recognize that, in practicing the invention, many other types of latches can also be used in combination with the other elements of the invention. For example, FIG. 17 shows a second alternate embodiment of a latch apparatus 170, operatively attached between intermediate long-link connection points 172 of two adjacent long-links 174, operatively connecting two intermediate treads 176, 178 of a foldable staircase 180, in accordance with the invention. The foldable staircase 180 includes a pair of the second alternate embodiments of the latch apparatus 170, with the latches 170 being attached to opposite sides of the staircase 180. It will be further noted, that in the embodiment of the foldable staircase 180, shown in FIG. 17, the treads 176, 178, 182, 184, 186 are fabricated from aluminum sheet metal, operatively joined by long and short links of a plastic or composite material, similar to those described above in relation to the exemplary embodiment of the foldable pet staircase 100.

FIGS. 18 and 19 respectively show enlarged views of a portion of the second alternate embodiment of the latch apparatus 170 in a disengaged and an engaged position, respectively. The latch 170 includes first and second articulating arms 171, 173 and a locking knob 175. The first articulating arm 171 of the latch 170 includes an elongated slot 177 therein, configured for sliding passage therethrough of a threaded fastener (not shown) extending outward from the second articulating arm 173 for threaded engagement with the locking knob 175. The slot 177 allows the first and second articulating arms 171, 173, of the latch 170, to be aligned with one another at various extended positions of the staircase 180, and locked together by tightening the knob 175 to clamp the articulating arms 171, 173 securely against one another. The second articulating arm 173 further includes a pair of anti-pivot locking ribs 179, 181, disposed along opposite edges of the second articulating arm 173, to thereby form a channel 183 configured for receiving the distal end of the first articulating arm 171, and providing additional support for maintaining the latch 170 in the engaged position shown in FIG. 19.

FIGS. 20 and 21 show a variation of the second embodiment of the latch apparatus 170, in which the second articulating arm 173 includes an anti-pivot locking rib 181 on only one edge of the second articulating arm 173.

Figure 22:
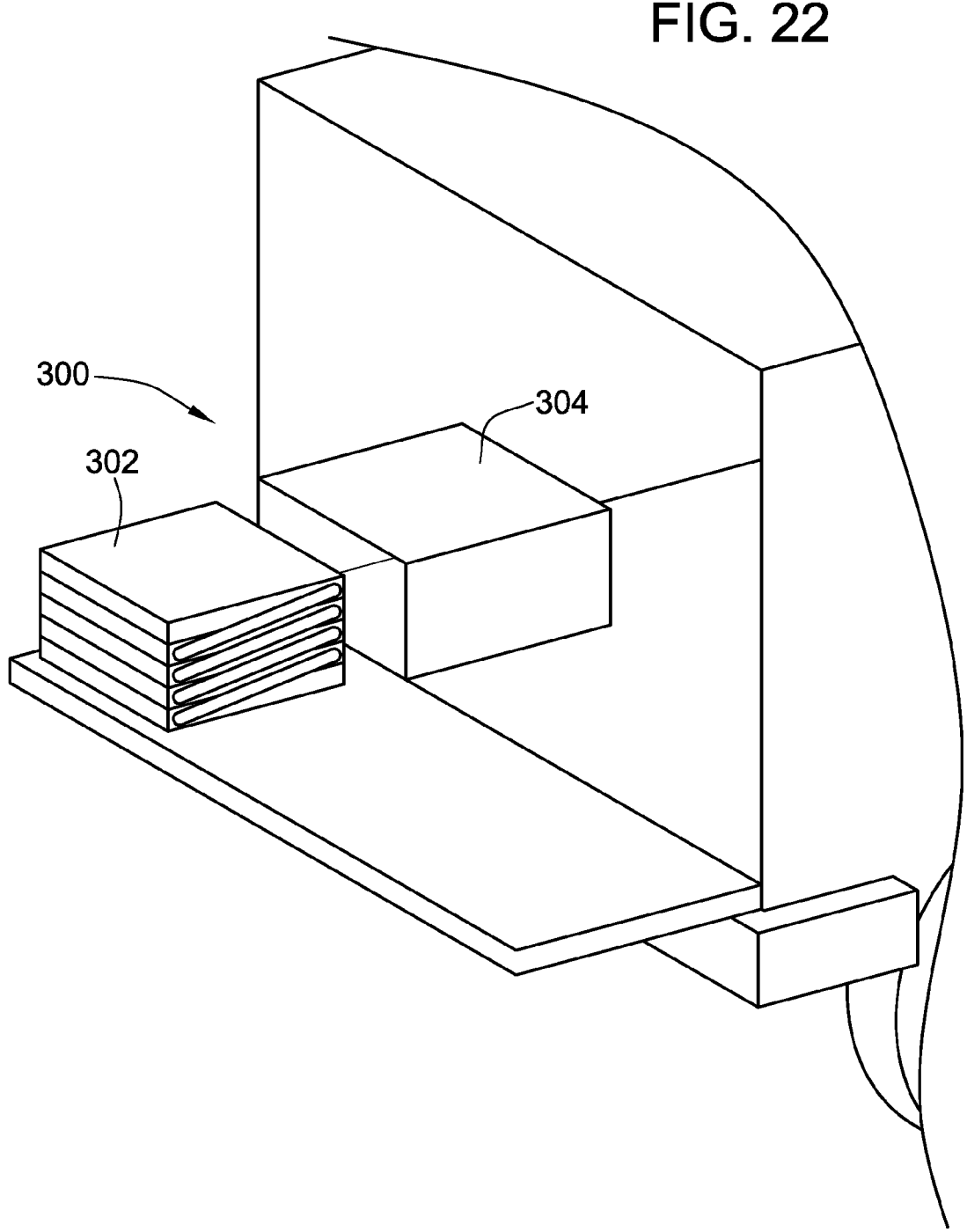
FIG. 22 is an exemplary embodiment of a foldable staircase apparatus, according to the invention, including a foldable staircase and a holder for receiving the staircase in a stowed position.

FIG. 22 shows a third exemplary embodiment of the invention in the form of a foldable staircase apparatus 300, including a foldable staircase 302, as described above, and a staircase holder 304 adapted for receiving the staircase 302 in the stowed position. The holder 304 includes mounting holes 306 adapted for attaching the holder 304 to a surface, such as the tailgate of a truck or a sport utility vehicle, or a trunk lid of a vehicle.

Figure 23:
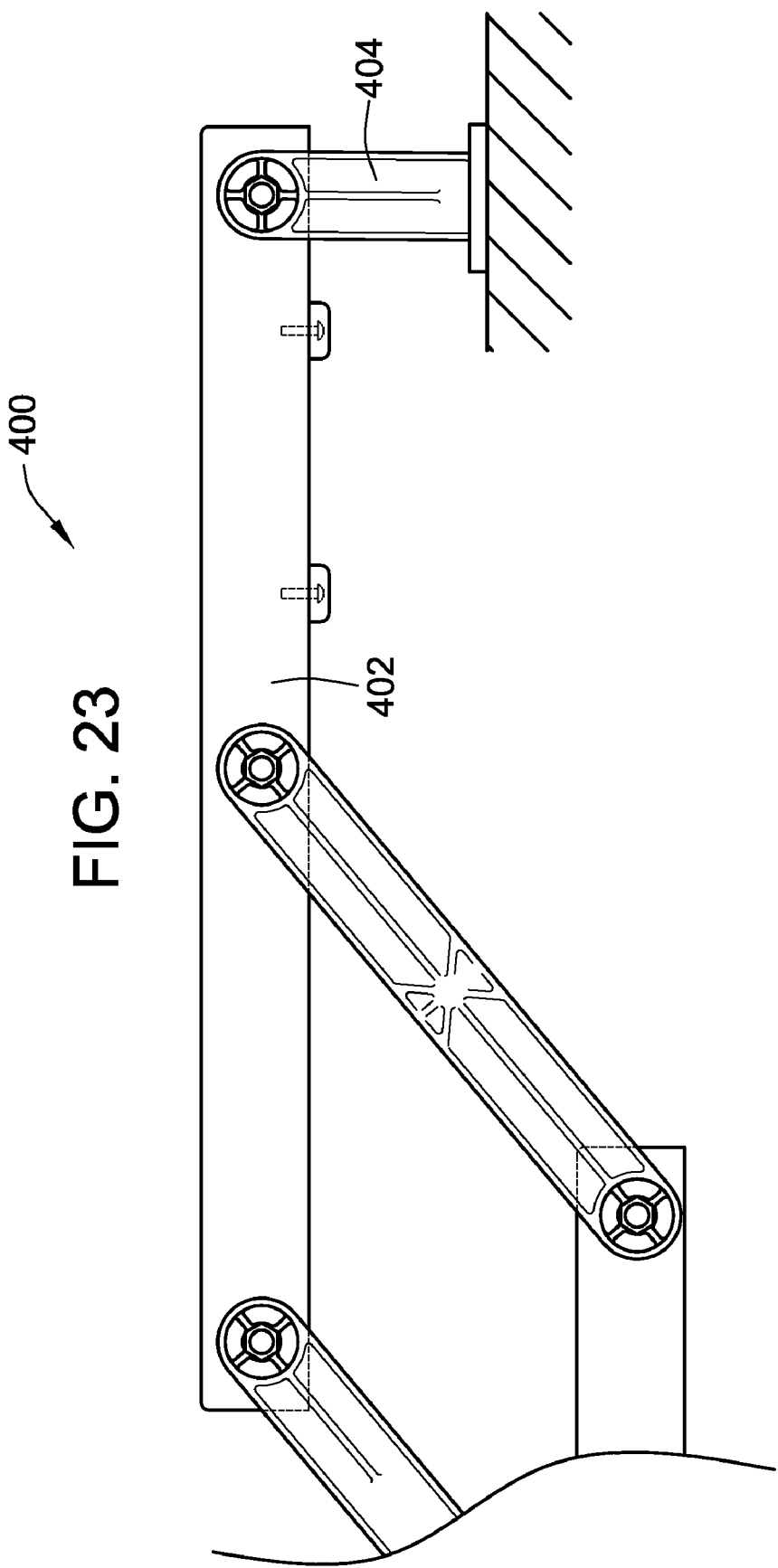
FIG. 23 is an exemplary embodiment of a foldable staircase apparatus, according to the invention, including a foldable staircase and a mounting bracket adapted for attachment to the top step of the staircase.

FIG. 23 shows a fourth exemplary embodiment of the invention, in the form of a foldable staircase apparatus 400, including a foldable staircase 402, as described above, and a mounting bracket 404 for pivotably attaching the staircase 402 to support structure, such as, but not limited to, a vehicle, a watercraft, or a table, so that the staircase 402 may be pivoted about the mounting bracket 404 in the stowed position of the staircase 404. In other embodiments, the mounting bracket 404 and staircase 402 may be configured so that the staircase 402 may be pivoted about the mounting bracket 404 in only an extended position. In yet other embodiments the mounting bracket 404 and staircase 402 may be configured so that the staircase 402 may be pivoted about the mounting bracket 404 in either the stowed or an extended position. An apparatus 400 including a foldable staircase 402, as described above, and a mounting bracket 404 may alternatively be configured so that the upper tread of the staircase 402 is releasable attachable to the mounting bracket 404, before or after extension, to provide stability in use, rather than being permanently pivotably attached.

FIG. 24 shows a fifth exemplary embodiment 500, according to the invention, having a foldable staircase 502 pivotably attached by a mounting bracket 504 to a watercraft 506. As shown in FIG. 24, the fifth exemplary embodiment of the invention 500 allows the foldable staircase 502 to be conveniently stowed on the deck 508 of the watercraft 506, in the manner illustrated in dashed lines in FIG. 24, for convenience deployment to aid a pet, such as a dog retrieving water fowl, in disembarking from and re-entering the watercraft 506. A rotation limiting device, such as the channel shaped bracket 510 shown in FIG. 24, a compliant block, or a strut, may be operatively attached to either the watercraft 506, or the staircase 502, to provide rotational positioning of the staircase 502 with respect to the watercraft 506.

FIG. 25 also illustrates an embodiment 600 of the invention, having a foldable staircase 602 mounted to a ladder 604, of the type which might extend over the side of a boat or into a swimming pool. The foldable staircase 602 is attached to the ladder 604 by a mounting apparatus 606 having a pair of arms 608 adapted for clamped attachment to rails 610 of the ladder 604, and a support strut 612 adapted for engaging one of the steps 614 of the ladder 604.

Figure 5A:
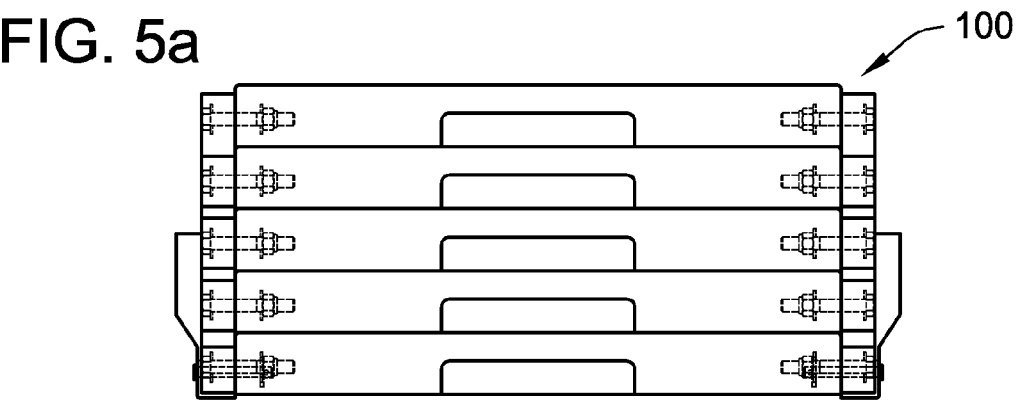
FIGS. 5A-C are front, right side and bottom views, respectively of the foldable staircase of FIG. 1, in a stowed position.
Figure 5B:
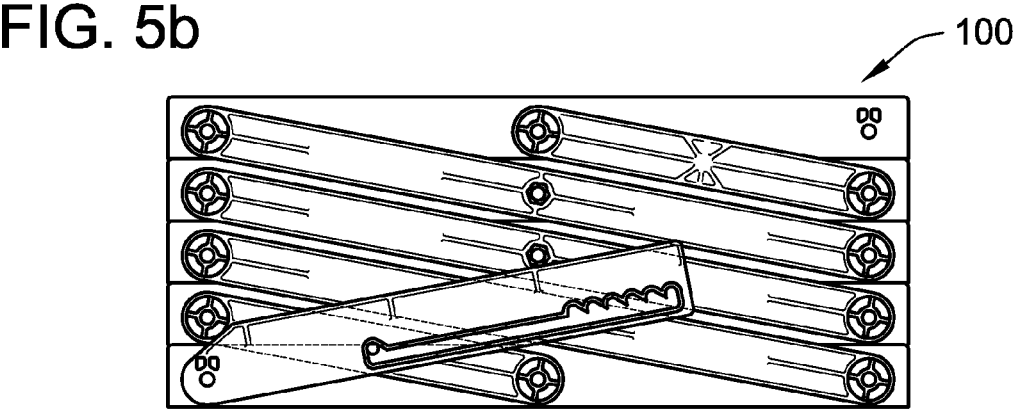
Figure 5C:
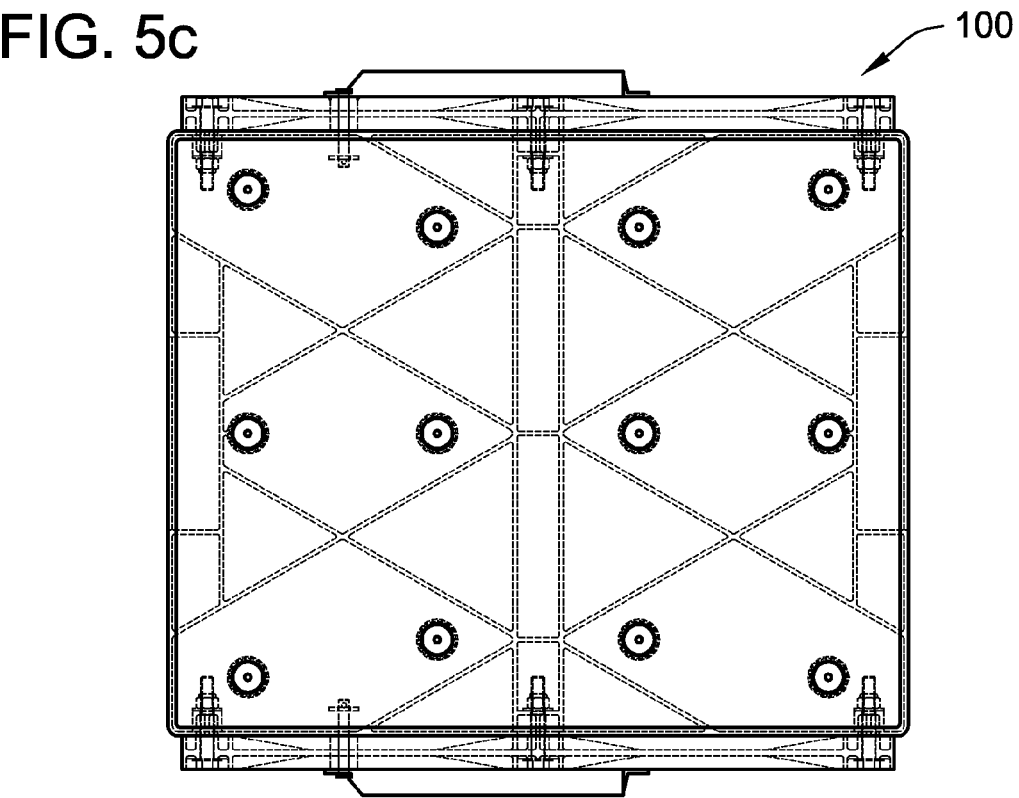
Figure 6:
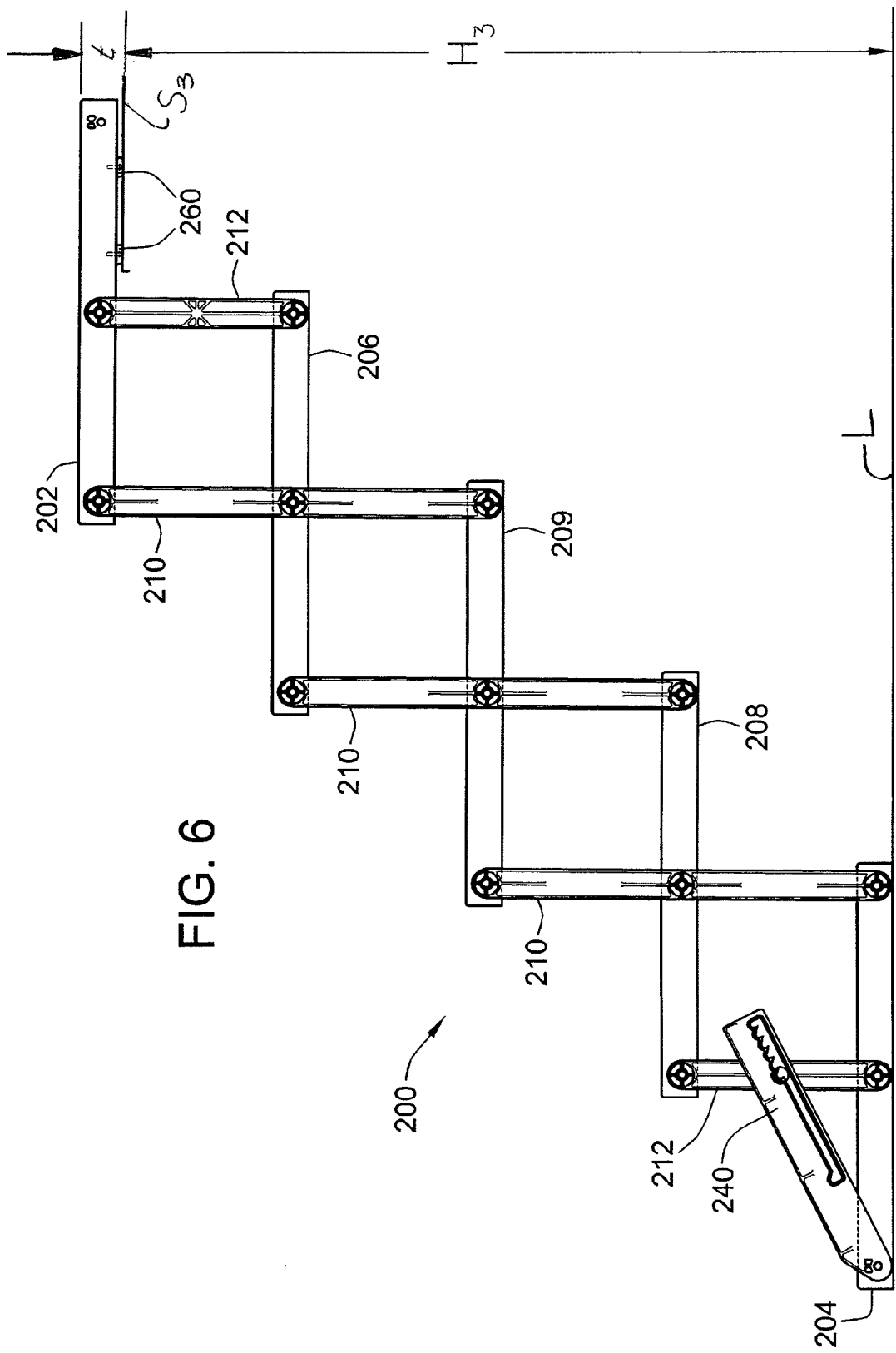
FIG. 6 is a right side view of a second exemplary embodiment of a foldable staircase, according to the invention, having five treads, but otherwise identical to the embodiment of FIGS. 1-5C, with the foldable staircase latched in the highest extended position.
Figure 8A:
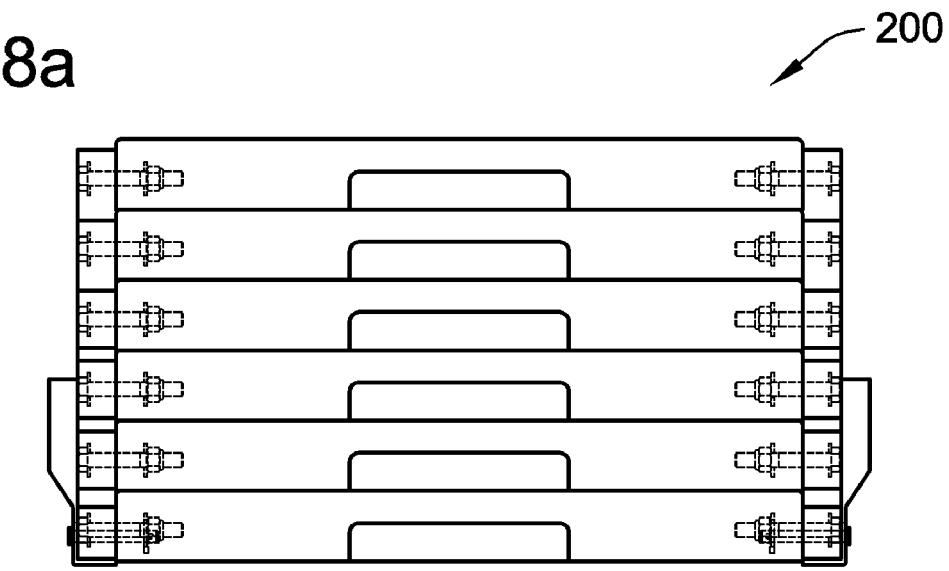
FIGS. 8A and 8B are front, right side views, respectively of the foldable staircase of FIG. 6, in a stowed position.
Figure 8B:
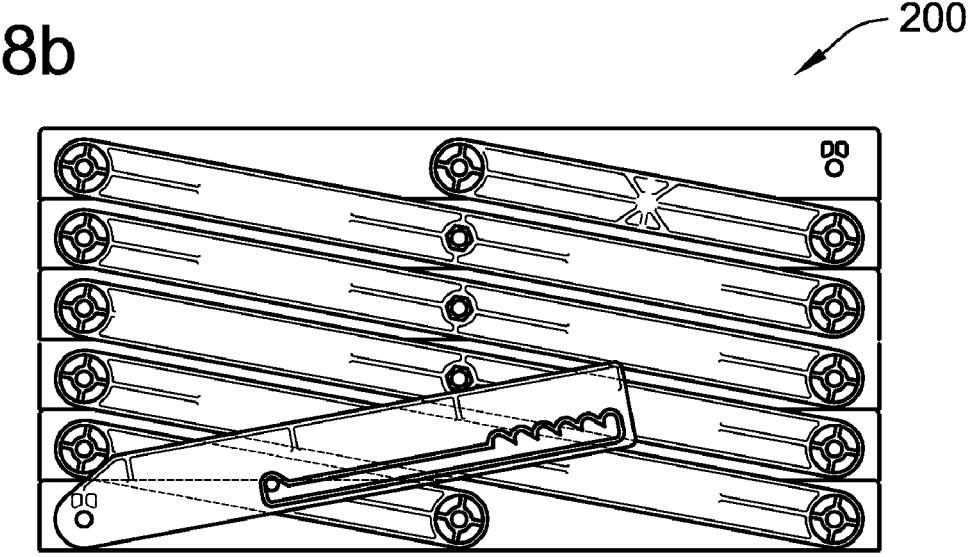
Figure 29:
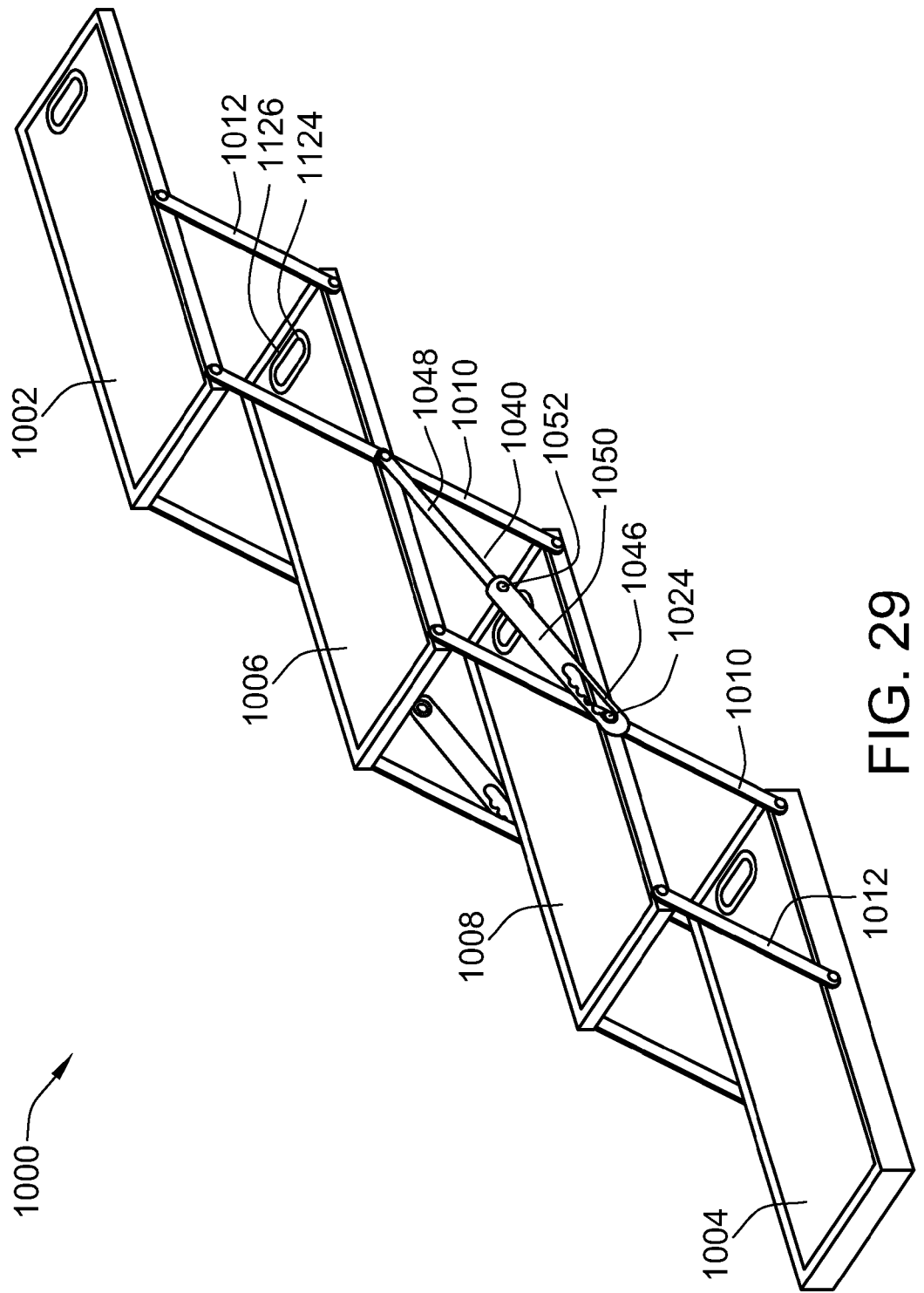
FIG. 29 is a perspective view of a foldable pet staircase including four treads formed of a composite material according to yet another embodiment of the invention.
Figure 30:
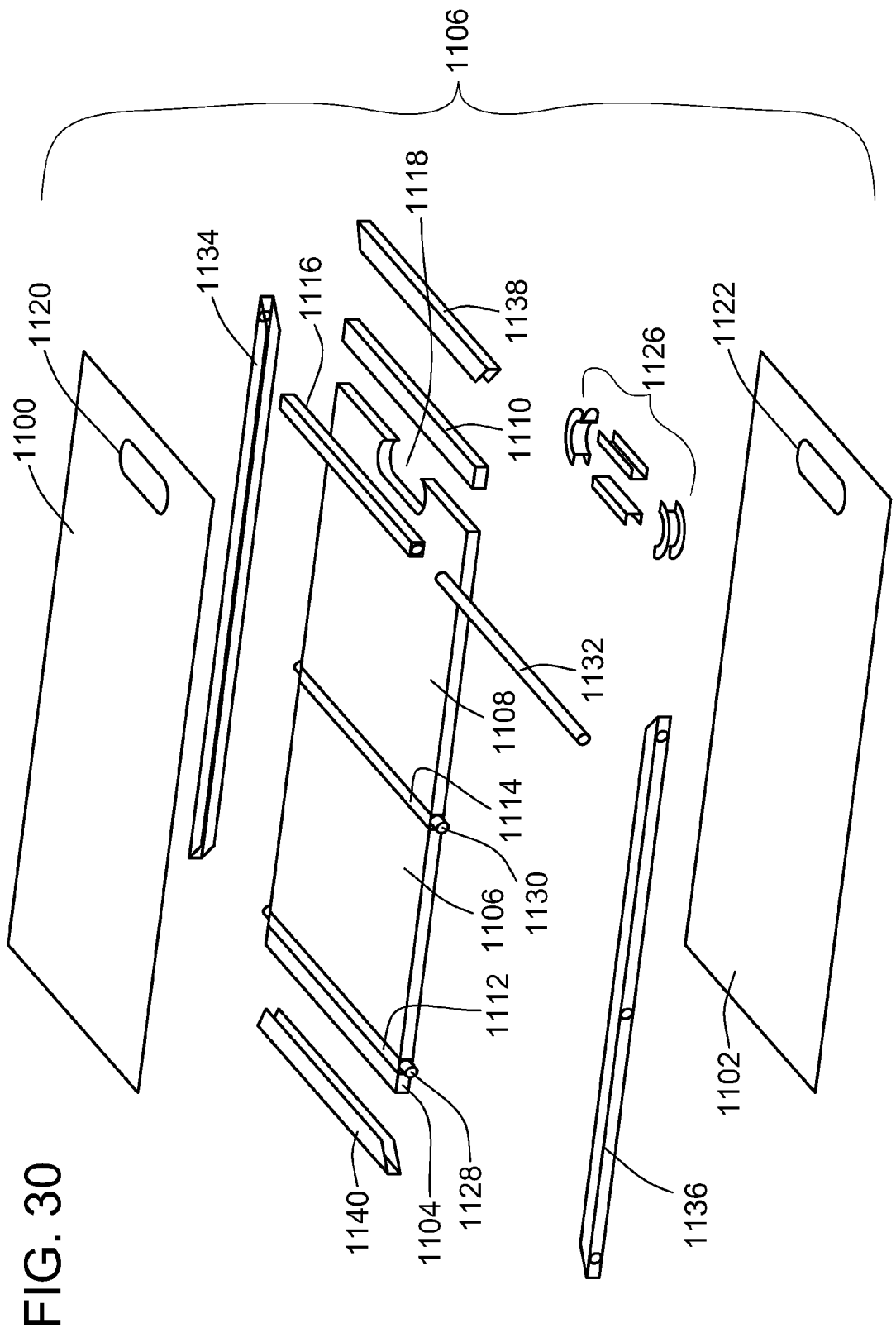
FIG. 30 is a exploded view of one of the treads of FIG. 29.

FIGS. 29-30 show a foldable pet staircase 1000 according to another embodiment of the present invention. The foldable pet stair case 1000 is configured similarly as the foldable staircase 100 of FIG. 1 including four treads 1002, 1004, 1006, 1008 joined by articulating links 1010, 1012. As shown, the foldable pet stair case 1000 includes a pair of latches 1040 pivotably connected to an upper intermediate tread 1006 and a lower intermediate tread 1008. Each of the pair of latches 1040 includes an upper brace 1048 and a lower brace 1050 connected by a connector 1052. Each of the pair of latches 1040 is configured to fold in half about the connector 1052 when the articulating links 1010, 1012 pivot to fold the foldable pet stair case 1000 into a stowed position similar to the stowed position of the previous embodiments as shown in FIGS. 5A and 8A, wherein the treads 1002, 1004, 1006, 1008 pivot in unison.

Each of the lower braces 1050 of the pair of latches 1040 includes multiple slots 1046, wherein a connector 1024 of the lower intermediate tread 1008 can slide in to fix the foldable pet stair case 1000 to a desired position. In the embodiment of FIG. 29, the pair of latches 1040 includes 5 slots to support 5 different positions of the foldable pet stair case 1000. The foldable pet staircase 1000 has a maximum horizontal reach and a minimum vertical reach when the connector 1024 is positioned in the outermost slot, and a minimum horizontal reach and a maximum vertical reach when the connector 1024 is in the innermost slot.

In this embodiment, the treads 1002, 1004, 1006, 1008 are formed of a composite material to reduce a total weight of the foldable pet stair case 1000 and to reduce a deflection in the treads 1002, 1004, 1006, 1008 when subjected to a load as a pet ascends or descends on the foldable pet stair case 1000. FIG. 30 is an exploded view of the upper intermediate tread 1006. As shown, the upper intermediate tread 1006 includes a four-piece core 1104, 1106, 1108, 1110 sandwiched between an upper skin 1100 and a lower skin 1102. A first side core piece 1104 is attached to a first center core piece 1106 by a first filler 1112 bonded between the first side core piece 1104 and the first center core piece 1106. The first center core piece 1106 is also attached to a second center core piece 1108 by a second filler 1114 bonded between the first center core piece 1106 and the second center core piece 1108. Further the second center core piece 1108 is attached to a second side core piece 1110 by a third filler 1116. As such, the first side core piece 1104, the first filler 1112, the first center core piece 1106, the second filler 1114, the second center core piece 1108, the third filler 1116, and the second side core piece 1110 are arranged in that order from one side to the other, forming the four-piece core. The fillers 1112, 1114, 1116 are securely bonded to respective core pieces 1104, 1106, 1108, 1110 using a suitable adhesive or a bonding compound.

Further, the upper and lower surfaces of the four-piece core 1104, 1106, 1108, 1110 are bonded to the upper skin 1100 and the lower skin 1102 via a suitable bonding compound, for example, a Nida-core Bonding compound commercially available through Nida-Core Corporation of St. Lucie, Fla. As shown in FIG. 30, the second center core piece 1108, the upper skin 1100 and the lower skin 1102 include slots 1118, 1120, 1122 defining a handle 1124 (FIG. 29). The slots 1118, 1120, 1122 are reinforced by a multi-piece hand grip 1126 formed of a suitable material such as a plastic.

Each of the fillers 1112, 1114, 1116 is provided with a rod 1128, 1130, 1132, wherein the rod 1128, 1130, 1132 is inserted through the filler 1112, 1114, 1116. The rods 1128, 1130, 1132 provide connection points for pivotably attaching the articulating links 1010, 1012 (FIG. 29) to sides of the treads 1002, 1004, 1006, 1008. The fillers 1112, 1114, 1116 and the rods 1128, 1130, 1132 are formed of a suitable material, preferably a glass-fiber material. Sides of the upper intermediate tread 1006 assembled as described are then reinforced with edge channels 1134, 1136, 1138, 1140.

The four-piece core 1104, 1106, 1108, 1110 is formed of a suitable composite material. The upper and lower skins 1100, 1102 are formed of a suitable thin film material. In one embodiment, the four-piece core 1104, 1106, 1108, 1110 is formed of a honeycomb composite material such as Nida-Core H11PP material having a thickness of about 0.5", which is commercially available through Nida-Core Corporation; and the upper and lower skins 1100, 1102 are formed of a carbon fiber material having a thickness of about 0.0315". As such, a total thickness of the tread 1006 is less than about 0.6" in this embodiment. However, in other embodiments, the total thickness of each of the treads 1002, 1004, 1006, 1008 can be between about 0.1" to 2", preferably between about 0.4" to 1.0".

The lower intermediate tread 1008 is formed and assembled the same as the upper intermediate tread 1008 as described above. The upper tread 1002 and the lower tread 1004 are also formed and assembled similarly as the upper intermediate tread 1008, except the first filler 1112 is not provided with the rod 1128 since the upper and lower treads 1002, 1004 only include four connection points for attachment of the articulating links 1010, 1012 as shown in FIG. 29.

The foldable pet staircase 1000 of this embodiment and other embodiments of this invention is designed to be conveniently portable and easily positioned between a first substantially horizontally flat surface, such as a ground, and a second substantially horizontally flat surface at a vertically elevated position from the first surface, such as a floor of a car, wherein a pet can walk towards the foldable pet staircase from the first or second surfaces, ascend or descend on the foldable pet staircase to the other surface, and walk way from the foldable pet staircase on the second or first surfaces. The foldable pet staircase 1000 is configured such that the lower tread 1004 rests on the first surface and the upper tread 1002 rests on the second surface securely enough for the pet to travel on without any extra attachment of the foldable pet staircase to the first or second surfaces. In one embodiment, the foldable pet staircase 1000 in its stowed position has a volume of about 0.64 cubic ft comprising about 22 inches length by about 16.89" width by about 2.96" thickness, and total weight of about 13.9 lb.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any element not expressly described herein as being essential to the practice of the invention. For example, the use of the term "element" in context with describing certain preferred embodiments of the invention is not intended to limit the invention to structures constructed by welding, or to structures formed from multiple components.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intend for the invention to be practiced otherwise than as specifically described herein. Accordingly, this invention includes all modifications and equivalents of the subject matter recited or suggested herein as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. An apparatus for assisting pets in moving between a substantially horizontally extending lower surface and a substantially horizontally extending elevated surface disposed at a vertical distance from one another, the apparatus comprising:
    a foldable staircase, having at least two stair treads operatively connected by articulating links in such a manner that the treads are pivotable in unison from a stowed position of the staircase, in which the treads are substantially stacked upon one another, to a plurality of extended positions, in which the articulating links position the treads in a spaced parallel relationship to one another with one of the at least two stair treads forming a top tread and the other of the at least two stair treads forming a bottom stair tread when the foldable staircase is deployed in one of the extended positions for assisting the pet in moving between the elevated and lower surfaces;
    both the top and the bottom stair tread having respective undersides thereof, with at least a portion of the underside of the bottom stair tread being adapted to rest upon the lower surface and at least a portion of the underside of the top tread being adapted to rest upon the elevated surface;
    the top and bottom stair treads each having a respective top surface and a respective edge thereof extending between the respective top surface and the underside of each of the top and bottom stair treads;
    the edges of the top and bottom stair treads defining a thickness of the top and bottom stair treads that is substantially de minimus in comparison to the vertical distance between the elevated and lower surfaces, such that, when the portions of the undersides of the top and bottom stair treads are resting on the elevated and lower surfaces respectively, the top surfaces of the top and bottom stair treads are substantially coplanar with the elevated and lower surfaces respectively and are offset therefrom by substantially only the thickness of the stair tread;
    the foldable staircase being completely separate from and not attached to either the lower and the elevated surfaces such that when the foldable staircase is deployed with the undersides of the top and bottom treads resting on the elevated and lower surfaces the pet may be urged to;
    a) step completely off of one of the elevated and lower surfaces onto a respective one of the top and bottom treads resting on that one of the elevated and lower surfaces;
    b) traverse the foldable staircase from the respective one of the top and bottom treads to the other of the top and bottom treads resting respectively on the other of the elevated and lower surfaces; and
    c) then step completely off of the other top and bottom treads and completely onto the respective other of the elevated and lower surfaces;
    the foldable staircase being further completely separate from and not attached to either the lower and the elevated surfaces such that the foldable staircase may be removed by moving the undersides of the top and bottom stair treads of the foldable staircase out of contact with the lower and upper surfaces, when the foldable staircase is not being utilized for moving the pet between the lower and elevated surfaces.

2. The apparatus of claim 1, wherein the foldable staircase further includes a selectively engagable latch for selectively securing the staircase in a selected one of the extended positions, when the latch is engaged.

3. The apparatus of claim 2, wherein the latch, when engaged, precludes further pivoting of the articulating links.

4. The apparatus of claim 1, wherein, the articulating links and treads are cooperatively configured and connected in such a manner that, in a fully extended one of the extended positions, the treads form a relatively flat surface, thereby allowing the staircase in the fully extended position to be used as a litter for transporting a person, animal, and/or cargo.

5. The apparatus of claim 4, wherein:
    the staircase further comprises a selectively engagable latch for selectively securing the staircase in at least one of the extended positions, when the latch is engaged; and
    the latch being disconnectable, and operatively connected to the treads and articulating links in such a manner that the staircase may only be placed in the fully extended position when the latch is disconnected.

6. The apparatus of claim 5, wherein, the latch is configured for selectively securing the staircase in the fully extended position.

7. The apparatus of claim 1, wherein, the articulating links are removable for use as splints for stabilizing fractured bones.

8. The apparatus of claim 1, wherein, each of the stair treads respectively includes a top surface and an underside thereof and at least one of the top or undersides of at least one of the stair treads includes a non-slip portion thereof.

9. The apparatus of claim 1, wherein, one or more of the treads includes openings therethrough for passage of water through the tread.

10. The apparatus of claim 1, wherein one or more of the treads includes hand-holds therein, positioned to facilitate adjustment of the staircase folded to an extended position thereof.

11. The apparatus of claim 1, further comprising a mounting bracket operatively connectable to the staircase, and adapted for attachment to a supporting structure.

12. The apparatus of claim 11, wherein, the folding staircase is pivotably attached to the mounting bracket, for pivoting motion from a stowed position to a deployed position of the staircase.

13. The apparatus of claim 1, further comprising, a staircase holder, adapted for receiving the staircase in the folded position.

14. The apparatus of claim 1, wherein, the foldable staircase comprises:
   a plurality of treads having respective front and rear edges thereof, and also having opposite side edges thereof joined by articulating links that are operatively connected to and disposed adjacently outward from the opposite side surfaces of the treads;
   the plurality of treads including a top tread, a bottom tread, and one or more intermediate treads, with each tread including three attachment points for the articulating links disposed along the opposite side edges,
   the three attachment points on each tread including a front tread attachment point disposed adjacent the front edge of the tread, a rear tread attachment point disposed adjacent the rear edge of the tread, and an intermediate tread attachment point disposed substantially halfway between the front and rear tread attachment points along each of the opposite side edges of the tread.

15. The apparatus of claim 14, wherein:
   the articulating links include long links and short links, with each of the long and short links having an upper tread attachment point and a lower tread attachment point at opposite ends thereof, and the long links also having an intermediate tread attachment point disposed between the upper and lower tread attachment points;
   a given intermediate tread of the staircase is attached to an adjacent tread by a given pair of long links with each long link of the given pair of long links having its respective intermediate tread attachment point pivotably attached to one of the intermediate tread attachment points of the intermediate tread;
   the upper tread attachment points of the given pair of long links are pivotably connected to the front tread attachment points of either the top tread, or another adjacent intermediate tread disposed above the given intermediate tread;
   the lower tread attachment points of the given pair of long links are attached to the rear tread attachment points of either the bottom tread or another adjacent intermediate tread disposed below the given intermediate tread;
   the top tread is pivotably connected to an adjacent intermediate tread immediately below the top tread by a top pair of short articulating links having their respective upper tread attachment points pivotably connected to the intermediate tread attachment points of the top tread, and their respective lower tread attachment points pivotably connected to the rear tread attachment points of the intermediate tread immediately below the top tread; and
   the bottom tread is pivotably connected to an adjacent intermediate tread immediately above the bottom tread by a second pair of the short articulating links, with each short articulating link of the second pair of short articulating links respectively having its lower tread attachment point pivotably connected to the intermediate tread attachment point of the bottom tread, and its upper tread attachment point pivotably connected to the front tread attachment point of the intermediate tread immediately above the bottom tread.

16. The apparatus of claim 15, wherein the foldable staircase further includes a selectively engagable latch for selectively securing the staircase in a selected one of the extended positions, when the latch is engaged; wherein the latch, when engaged, precludes further pivoting of the articulating links; and wherein the latch operatively connects, at opposite ends thereof, to the intermediate attachment points of two adjacent treads.

17. The apparatus of claim 1, wherein, the foldable staircase comprises:
   a plurality of treads having respective front and rear edges thereof, and also having opposite side surfaces thereof joined by articulating links that are operatively connected to and disposed adjacently outward from the opposite side edges of the treads;
   the plurality of treads including the top tread, the bottom tread, and one or more intermediate treads, with each intermediate tread including three attachment points for the articulating links disposed along the opposite side edges, and the top and bottom treads each including at least two attachment points;
   the three attachment points on each intermediate tread including a front tread attachment point disposed adjacent the front edge of the tread, a rear tread attachment point disposed adjacent the rear edge of the tread, and an intermediate tread attachment point disposed substantially halfway between the front and rear tread attachment points along each of the opposite side edges of the tread;
   the two attachment points on the top tread including a front tread attachment point disposed adjacent the front edge of the tread and an intermediate tread attachment point disposed substantially halfway between the front and rear edges of the top tread along each of the opposite side edges of the top tread;
   the two attachment points on the bottom tread including a rear tread attachment point disposed adjacent the rear edge of the tread and an intermediate tread attachment point disposed substantially halfway between the front and rear edges of the bottom tread along each of the opposite side edges of the bottom tread;
   each stair tread having a respective underside thereof, with at least a portion of the underside of the bottom stair tread being adapted to rest upon the lower surface and at least a portion of the underside of the top tread being adapted to rest upon the elevated surface;

each stair tread having a respective top surface joined by the respective opposite side edges thereof;

the opposite side edges of the top and bottom stair treads defining a thickness of the top and bottom stair treads that is substantially de minimus in comparison to the vertical distance between the elevated and lower surfaces, such that, when the portions of the undersides of the top and bottom stair treads are resting on the elevated and lower surfaces respectively, the top surfaces of the top and bottom stair treads are substantially coplanar with the elevated and lower surfaces respectively and are offset therefrom by substantially only the thickness of the stair treads which is substantially smaller than the vertical distance between the elevated and lower surfaces, so that the top surfaces of the top and bottom stair treads extend over and substantially coplanar with the elevated and lower surfaces respectively.

18. The foldable staircase of claim 17, wherein:

the articulating links include long links and short links, with each of the long and short links having an upper tread attachment point and a lower tread attachment point at opposite ends thereof, and the long links also having an intermediate tread attachment point disposed between the upper and lower tread attachment points;

a given intermediate tread of the staircase is attached to an adjacent tread by a given pair of long links with each long link of the given pair of long links having its respective intermediate tread attachment point pivotably attached to one of the intermediate tread attachment points of the intermediate tread;

the upper tread attachment points of the given pair of long links are pivotably connected to the front tread attachment points of either the top tread, or another adjacent intermediate tread disposed above the given intermediate tread;

the lower tread attachment points of the given pair of long links are attached to the rear tread attachment points of either the bottom tread or another adjacent intermediate tread disposed below the given intermediate tread;

the top tread is pivotably connected to an adjacent intermediate tread immediately below the top tread by a top pair of short articulating links having their respective upper tread attachment points pivotably connected to the intermediate tread attachment points of the top tread, and their respective lower tread attachment points pivotably connected to the rear tread attachment points of the intermediate tread immediately below the top tread; and the bottom tread is pivotably connected to an adjacent intermediate tread immediately above the bottom tread by a second pair of the short articulating links, with each short articulating link of the second pair of short articulating links respectively having its lower tread attachment point pivotably connected to the intermediate tread attachment point of the bottom tread, and its upper tread attachment point pivotably connected to the front tread attachment point of the intermediate tread immediately above the bottom tread.

19. An extension kit apparatus, for extending a foldable staircase for assisting pets in moving thereupon between a substantially horizontally extending lower surface and a substantially horizontal horizontally extending elevated surface disposed at a vertical distance from one another, wherein:

the foldable staircase comprises;

a plurality of existing stair treads operatively connected by articulating links in such a manner that the existing stair treads are pivotable in unison from a stowed position of the staircase, in which the existing treads are substantially stacked upon one another, to a plurality of extended positions, in which the articulating links position the treads in a spaced parallel relationship to one another with one of the existing stair treads forming a top stair tread and another of the existing stair treads forming a bottom stair tread when the foldable staircase is deployed in one of the extended positions for assisting the pet in moving between the elevated and lower surfaces;

the plurality of existing treads having respective front and rear edges thereof, and also having opposite side surfaces thereof joined by existing articulating links that are operatively connected to and disposed adjacently outward from the opposite side edges of the treads;

the plurality of existing treads further including one or more intermediate treads, disposed between the top and bottom treads, with each intermediate tread including three attachment points for the existing articulating links disposed along the opposite side edges, and the top and bottom treads each including at least two attachment points for the existing articulating links;

the three attachment points on each intermediate tread including a front tread attachment point disposed adjacent the front edge of the tread, a rear tread attachment point disposed adjacent the rear edge of the tread, and an intermediate tread attachment point disposed substantially halfway between the front and rear tread attachment points along each of the opposite side edges of the tread;

the two attachment points on the top tread including a front tread attachment point disposed adjacent the front edge of the tread and an intermediate tread attachment point disposed substantially halfway between the front and rear edges of the top tread along each of the opposite side edges of the top tread;

the two attachment points on the bottom tread including a rear tread attachment point disposed adjacent the rear edge of the tread and an intermediate tread attachment point disposed substantially halfway between the front and rear edges of the bottom tread along each of the opposite side edges of the bottom tread;

each stair tread having a respective underside thereof, with at least portion of the underside of the bottom stair tread being adapted to rest upon the lower surface and at least a portion of the underside of the top tread being adapted to rest upon the elevated surface;

each stair tread having a respective top surface joined by the respective opposite side edges thereof;

the opposite side edges of the top and bottom stair treads defining a thickness of the top and bottom stair treads that is substantially smaller than de minimus in comparison to the vertical distance between the elevated and lower surfaces, such that, when the portions of the undersides of the top and bottom stair treads are resting on the elevated and lower surfaces respectively, the top surfaces of the top and bottom stair treads are substantially coplanar with the elevated and lower surfaces respectively and are offset therefrom by substantially only the thickness of the stair treads which is substantially smaller than the vertical distance between the elevated and lower surfaces, so that the top surfaces of the top and bottom stair treads extend over and substantially coplanar with the elevated and lower surfaces respectively whereby the pet perceives the top surfaces of the top and bottom stair treads to be essentially extensions of the elevated and lower surfaces respectively;

the existing stair treads of the foldable staircase being further operatively connected by the existing articulating links in such a manner that as the existing treads are pivoted in unison from the stowed position of the staircase, to the plurality of extended positions, the existing articulating links position the existing treads in a spaced parallel and horizontal relationship to one another, with the extended positions including an original maximum vertical distance in which the existing treads are substantially horizontal and beyond which the existing treads can no longer be positioned horizontally, and the extension kit apparatus comprises;

at least one additional tread, and a corresponding pair of additional articulating links;

the at least one additional tread being operatively attachable to the existing treads by the corresponding additional articulating links and two or more of the existing articulating links of the staircase, in such a manner that once the at least one additional tread is operatively attached the existing and at least one additional treads are pivotable in unison from a stowed position of the staircase, in which the existing and at least one additional treads are substantially stacked upon one another, to an augmented plurality of extended positions, in which the existing and additional articulating links position the existing and at least one additional treads in a spaced parallel relationship to one another, with the augmented plurality of extended positions including at least one augmented extended position whereat the extended foldable staircase spans an augmented maximum vertical distance, greater than the original vertical distance, at which the existing and at least one additional treads are substantially horizontal and beyond which the existing and at least one additional treads cannot be positioned horizontally.

20. The extension kit apparatus of claim 19, wherein:

the foldable staircase is further configured for assisting pets in ascending and descending thereupon between a substantially horizontally extending lower surface and a substantially horizontal elevated surface disposed at a vertical distance from one another that is substantially equal to the original maximum vertical distance;

one of the at least two existing stair treads of the foldable staircase forms a top tread and the other of the at least two existing stair treads forms a bottom stair tread of the foldable staircase when the foldable staircase is deployed in one of the extended positions for assisting the pet in ascending or descending between the elevated and lower surfaces;

both the top and the bottom stair tread have respective undersides thereof, with at least portion of the underside of the bottom stair tread being adapted to rest upon the lower surface and at least a portion of the underside of the top tread being adapted to rest upon the elevated surface;

the top and bottom stair treads each have a respective top surface and a respective edge thereof extending between the respective top surface and the underside of each of the top and bottom stair treads;

the edges of the top and bottom stair treads define a thickness of the top and bottom stair treads that is substantially smaller than the original maximum vertical distance between the elevated and lower surfaces, such that, when the portions of the undersides of the top and bottom existing stair treads are resting on the elevated and lower surfaces respectively, the top surfaces of the top and bottom existing stair treads are substantially coplanar with the elevated and lower surfaces respectively and are offset therefrom by substantially only the thickness of the stair treads which is substantially smaller than the original maximum vertical distance between the elevated and lower surfaces, and such that the pet perceives the top surfaces of the top and bottom stair treads as being essentially extensions of the elevated and lower surfaces respectively;

the extension kit apparatus being further configured such that, once the at least one additional tread is operatively attached to the existing stair treads, one of the existing or at least one additional stair treads forms a top step having an underside thereof and another of the existing or at least one additional stair treads forms a bottom step having an underside thereof, the total number of stair treads is increased by the integer number of at least one additional stair treads in the extension kit, and the foldable staircase will extend an additional vertical distance to the new maximum vertical distance when an underside of a top stair tread of the foldable staircase is resting on an elevated surface and the underside of a bottom stair tread of the foldable staircase resting on a lower surface spaced from one another at the new maximum vertical distance.

21. The foldable staircase of claim 18, wherein, the articulating links and top surfaces of the stair treads are configured such that the pet cannot see any space between the star treads when traversing the staircase.

22. A foldable pet staircase, comprising:

a plurality of treads including a top tread, a bottom tread and one or more intermediate treads, the bottom tread securely placed on a first substantially horizontally flat surface and the top tread securely placed on a second substantially flat surface, the second surface being at a vertically elevated position from the first surface, wherein the top and bottom treads are not physically hooked or attached to the first and second surfaces respectively, whereby a pet travels on the first surface or the second surface toward the bottom tread or the top tread, ascends or descends on the plurality of treads to the other surface, and travels on the other surface;

the top tread and the bottom tread having a thickness less than about 1" such that when the top tread and bottom treads are placed on the first and second surfaces respectively, the top tread and the bottom tread are substantially coplanar with the first and second surfaces respectively, and are offset therefrom by less than about 1";

the plurality of treads having respective front and rear edges thereof, and also having opposite side surfaces thereof joined by articulating links that are operatively connected to and disposed adjacently outward from the opposite side edges of the treads;

the plurality of treads including attachment points for the articulating links disposed along the opposite side edges; and each of the plurality of treads includes a multi-piece composite core bonded between a top skin and a bottom skin having composite pieces of the multi-piece composite core bonded with a filler between the composite pieces, wherein the filler is configured to house a rod for providing the attachment points.

23. A method for assisting pets in moving between a substantially horizontally extending lower surface and a substantially horizontal elevated surface disposed at a vertical distance from one another using a portable foldable staircase that is not attached to either the lower or elevated surface and includes at least a top stair tread and a bottom stair tread operatively connected by articulating links with the top and bottom stair treads each having a respective top, underside and thickness thereof, with the thickness of the treads being substantially de minimus in comparison to the vertical distance between the elevated and lower surfaces, the method comprising:

deploying the foldable staircase between the elevated and lower surfaces by resting portions of undersides of the top and bottom stair treads on the elevated and lower surfaces respectively in such a manner that top surfaces of the top and bottom stair treads are substantially coplanar with the elevated and lower surfaces respectively, being offset therefrom by substantially only the thicknesses of the top and bottom stair treads, so that the top surfaces of the top and bottom stair treads extend over and substantially coplanar with the elevated and lower surfaces respectively;

leading the pet along one of the lower and elevated surfaces to a location on the one of the lower and elevated surfaces adjacent the foldable staircase;

urging the pet to step off of the one of the lower and elevated surfaces onto a respective one of the top and bottom stair treads resting on the one of the lower and elevated surfaces;

urging the pet to traverse the foldable staircase from a respective one of the top and bottom stair treads onto the respective other of the top and bottom stair treads resting on the other of the lower and elevated surfaces;

urging the pet to step off of the other of the top and bottom stair treads onto the other of the lower and elevated surfaces; and removing the foldable staircase by moving the undersides of the top and bottom stair treads of the foldable staircase out of contact with the lower and upper surfaces.

\* \* \* \* \*